(12) United States Patent
Hahn et al.

(10) Patent No.: US 6,452,349 B1
(45) Date of Patent: Sep. 17, 2002

(54) ELECTRONICALLY COMMUTATED MOTOR

(75) Inventors: Alexander Hahn, Boll; Hermann Rappenecker, Vohrenbach, both of (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/831,103

(22) PCT Filed: Oct. 21, 1999

(86) PCT No.: PCT/EP99/07998

§ 371 (c)(1),
(2), (4) Date: May 3, 2001

(87) PCT Pub. No.: WO00/28646

PCT Pub. Date: May 18, 2000

(30) Foreign Application Priority Data

Nov. 9, 1998 (DE) .......................................... 198 51 615

(51) Int. Cl.[7] ................................................ H02P 7/06
(52) U.S. Cl. .................. 318/254; 318/439; 318/138; 318/599; 318/811; 318/801; 318/803
(58) Field of Search ................................ 318/254, 439, 318/138, 798, 799, 800, 801, 802, 803, 599, 811

(56) References Cited

U.S. PATENT DOCUMENTS

| 4,039,914 | A |   | 8/1977 | Steigerwald et al. | ........ 318/375 |
| 4,901,366 | A |   | 2/1990 | Roettger | ..................... 388/811 |
| 5,017,846 | A | * | 5/1991 | Young et al. | ................ 318/244 |
| 5,291,106 | A |   | 3/1994 | Murty et al. | ................. 318/375 |
| 5,296,787 | A |   | 3/1994 | Albrecht et al. | ............. 318/433 |
| 5,361,021 | A |   | 11/1994 | Meyer et al. | ................. 318/254 |
| 5,373,436 | A |   | 12/1994 | Yamaguchi et al. | ........... 363/98 |
| 5,384,522 | A |   | 1/1995 | Toriyama et al. | ............. 318/371 |
| 5,510,688 | A | * | 4/1996 | Schwarz | ...................... 318/801 |
| 5,534,763 | A | * | 7/1996 | Williams et al. | ............. 318/799 |
| 5,600,216 | A |   | 2/1997 | Karwath et al. | ............. 318/291 |
| 5,712,550 | A |   | 1/1998 | Boll et al. | .................... 318/434 |
| 5,751,128 | A | * | 5/1998 | Chalupa et al. | .............. 318/439 |
| 5,773,941 | A |   | 6/1998 | Moritz et al. | ................ 318/254 |
| 5,920,164 | A |   | 7/1999 | Moritz et al. | ................ 318/254 |
| 5,933,573 | A |   | 8/1999 | Lukenich et al. | ........... 388/811 |
| 6,034,493 | A | * | 3/2000 | Boyd et al. | .................. 318/254 |
| 6,147,465 | A |   | 11/2000 | Hollenbeck | ................. 318/254 |
| 6,163,117 | A | * | 12/2000 | Rappenecker | ............... 318/254 |

FOREIGN PATENT DOCUMENTS

| DE | 15 38 293 |   | 7/1969 |
| DE | 36 14 093 | A1 | 11/1987 |
| DE | 36 29 186 | A1 | 3/1988 |
| DE | 37 18 309 | A1 | 12/1988 |

(List continued on next page.)

OTHER PUBLICATIONS

Derwent WPI English abstract of DE 36 29 186–A1; Schörlin/G.Berger GmbH, publ. Mar. 10, 1988.
Derwent WPI English abstract of JP 61–098 187–A1, Mitsubishi, Inverter Control System, publ. May 16, 1986, based on Japanese application 59–216 338 of Oct. 17, 1984.

(List continued on next page.)

*Primary Examiner*—Robert E. Nappi
*Assistant Examiner*—Rina I. Duda
(74) *Attorney, Agent, or Firm*—Milton Oliver; Ware, Fressola Van Der Sluys & Adolphson LLP

(57) ABSTRACT

In an electronically commutated motor, both the driving current ($i_2$) and the braking current ($i_2'$) are monitored. When excessive driving current occurs, a pulse duty factor which regulates the current is reduced. When excessive braking current occurs, this pulse duty factor is increased. For this purpose, an analog circuit with two current limiting members is disclosed, as well as a circuit in which these functions are implemented by software in a microcontroller, so that current measurement can be dispensed with. Finally, a combination of these features is disclosed, in which hardware current limitation and software current limitation work together.

21 Claims, 28 Drawing Sheets

FOREIGN PATENT DOCUMENTS

| | | |
|---|---|---|
| DE | 38 35 031 A1 | 5/1990 |
| DE | 40 09 184 A1 | 9/1991 |
| DE | G 92 00 006.1 U1 | 6/1992 |
| DE | 42 23 208 A 1 | 1/1994 |
| DE | 43 27 483 A 1 | 2/1995 |
| DE | 196 15 072 A1 | 10/1996 |
| DE | 196 08 758 A1 | 9/1997 |
| EP | 0 081 684 B1 | 9/1987 |
| EP | 0 472 052 B1 | 11/1995 |
| EP | 0 521 709 B1 | 5/1996 |
| EP | 0 739 084 A2 | 10/1996 |
| EP | 0 742 637 A1 | 11/1996 |
| EP | 0 822 650 A2 | 2/1998 |
| EP | 0 739 084 A3 | 3/1998 |
| JP | 61-98187 | 5/1986 |
| JP | 6-014 583 | 1/1994 |
| JP | 8-223977 | 8/1996 |
| JP | 10-23779 | 1/1998 |
| WO | WO 92-17935 | 10/1992 |
| WO | WO 97/25767 | 7/1997 |

OTHER PUBLICATIONS

Derwent WPI English abstract of JP 8–223 977–A1, Fujitsu General, Brushless Motor Controlling Method, publ. Aug. 30, 1996, based on Japanese application 7–047 782 of Feb. 13, 1995.

Clemente & Dubhashi, "HV Floating MOS–Gate driver IC, " publ. by International Rectifier, CA.

P.P. Acarnley, Univ. of Newcastle, "Current Measurement in Three–phase Brushless DC Drives," IEE Proceedings–B. vol. 140, # 1. United Kingdom, Jan. 1993.

Schumbrutzki, W., "Aufwandarme SIPMOS—Halbbrücke für Frequenzumrichter" [Inexpensive SIPMOS Half–Bridges for Frequency Converters], *Siemens Componentes*, vol. 22, # 6 (1984).

Sandrini et al., "L6384, L6385, L6386 & L6387 Application Guide," publ. by STMicroelectronics in Italy, pp. 1–17, Sep. 2000.

Blanchard et al, "Low on–resistance, low–voltage power MOSFETs for motor–drive applications," Siliconix Inc., Santa Clara, CA, from ELECTRO '86 Conference Record, vol. 11 (L.A., 1986).

\* cited by examiner

| phi_el | 700 | | | 702 | | | 704 | | | EN | | | IN | | |
|---|---|---|---|---|---|---|---|---|---|---|---|---|---|---|---|
| | HS1 | HS2 | HS3 | 81 | 83 | 85 | 80 | 82 | 84 | EN1 | EN2 | EN3 | IN1 | IN2 | IN3 |
| 0°..60° | 1 | 0 | 1 | 0 | 1 | 0 | 1 | 0 | 0 | 0 | 0 | 1 | 1 | TRI | 1 |
| 60°..120° | 1 | 0 | 0 | 0 | 0 | 1 | 1 | 0 | 0 | 0 | 1 | 0 | 1 | 1 | TRI |
| 120°..180° | 1 | 1 | 0 | 0 | 0 | 1 | 0 | 1 | 0 | 1 | 0 | 0 | 1 | 1 | TRI |
| 180°..240° | 0 | 1 | 0 | 1 | 0 | 0 | 0 | 1 | 0 | TRI | 1 | 1 | 1 | 1 | 1 |
| 240°..300° | 0 | 1 | 1 | 1 | 0 | 0 | 0 | 0 | 1 | 0 | 0 | 0 | TRI | 1 | 1 |
| 300°..360° | 0 | 0 | 1 | 0 | 1 | 0 | 0 | 0 | 1 | 1 | 0 | 0 | 1 | TRI | 1 |

706 brackets columns 702 and 704. 708 brackets EN and IN. 740 points to EN3 cell.

Fig. 2

ELECTRONICALLY COMMUTATED MOTOR

FIELD OF THE INVENTION

The invention concerns an electronically commutated motor having a permanent-magnet rotor and a stator.

BACKGROUND

Electronically commutated motors of this kind are known in many variants.

One object of the invention is to make available a new electronically commutated motor.

SUMMARY OF THE INVENTION

According to the invention, this object is achieved by an electronically commutated motor having a rotor and a stator; having a stator winding arrangement which can be supplied via a full bridge circuit with current from a direct-current source, which full bridge circuit has in each bridge arm an upper MOSFET (Metal oxide Semiconductor Field Effect Transistor) transistor that is connected to a positive line of the direct-current source and a lower transistor that is connected to a negative line of the direct-current source; having a commutation arrangement for commutating said transistors, which commutation arrangement is configured in order, as a function at least of the position of the rotor, in a first bridge arm to switch on only one transistor and in a second bridge arm, controlled by a PWM signal, alternatingly to switch on the upper and the lower transistor, and having an arrangement which, as a function of at least one motor variable, upon the occurrence of a braking current in the bridge circuit that exceeds a predefined value, modifies the pulse duty factor of said PWM signal in such a way that the current produced by the motor in generator mode is reduced.

An electronically commutated motor of this kind is highly suitable for drive applications in which external influences can cause a desired rotation speed to be exceeded, as a result of which the motor, with this type of bridge circuit, automatically transitions into braking mode; and it is guaranteed that motor limit values defined in the context of said braking mode are not, or cannot substantially be, exceeded.

Another solution to the stated object is achieved by an electronically commutated motor having a rotor and a stator; having a stator winding arrangement which is supplied via a full bridge circuit with current from a direct-current source, which full bridge circuit has in each bridge arm an upper NMOS transistor that is connected to a positive line of the direct-current source and a lower transistor that is connected to a negative line of the direct-current source, and there is associated with each upper transistor of a bridge arm a storage capacitor that can be charged via the lower transistor of said bridge arm and serves to supply said upper transistor with a control voltage; having a commutation arrangement for commutating said transistors, which commutation arrangement is configured in order, as a function at least of the position of the rotor, in a first bridge arm to switch on only one transistor and in a second bridge arm alternatingly to switch on the upper and the lower transistor, the motor rotation speed being monitored and, in the event it falls below a predefined rotation speed value, after a predefined time has elapsed the upper transistors of the full bridge circuit being briefly blocked and the lower transistors of the full bridge circuit being briefly switched on, in order to charge the storage capacitors of the upper transistors and thereby to ensure reliable control of said upper transistors even at low motor rotation speeds or when the motor is at rest.

The result is that in the context of a motor having a full bridge circuit of this kind with NMOS transistors, operability is ensured even if the rotation speed becomes very low or even decreases to zero.

The stated object is also achieved by a method for operating an electronically commutated motor having a permanent-magnet rotor and a stator; having a stator winding arrangement which can be supplied via a full bridge circuit with current from a direct-current source, which complete bridge circuit has a plurality of bridge arms and has in each bridge arm an upper MOSFET transistor that is connected to a positive line of the direct-current source and a lower transistor that is connected to a negative line of the direct-current source; having a commutation arrangement for commutating said transistors, which commutation arrangement is configured in order, as a function at least of the position of the rotor, in a first bridge arm to switch on only one transistor and in a second bridge arm, controlled by a PWM signal, alternatingly to switch on the upper and the lower transistor; and having a microprocessor or microcontroller, hereinafter called a microprocessor, comprising the following steps: in the microprocessor, based on a synthetic model of the motor, monitoring occurs as to whether the direct-current voltage conveyed to the motor is at a predefined relationship to the voltage induced in the motor; if the relationship is not being adhered to, correspondingly modifying, by the microprocessor, the pulse duty factor of the PWM signal with which the upper and the lower transistor of the second bridge arm are alternatingly switched in order to correct said relationship, in order by means of said change in the pulse duty factor to counteract any excursion beyond the predefined relationship.

The result that can thereby be achieved, by correspondingly configuring the software, i.e. by means of a synthetic (and optionally simplified) model of the motor, is that the latter operates in a range in which it is not at risk of overload. In some motor types with a high specific output, for example, too high an operating current or braking current could generate such a high stator magnetic field that the permanent-magnetic rotor becomes demagnetized; this can be prevented in very simple fashion by the method according to the present invention, significantly enhancing operating reliability.

The stated object is achieved in a different fashion by means of an electronically commutated motor having a rotor, and having a stator on which is arranged a stator winding arrangement with which is associated a full bridge circuit having a plurality of parallel bridge arms, each of which has an upper transistor that is connected to a positive line of a direct-current source and a lower transistor that is connected to a negative line of the direct-current source, the two transistors of a bridge arm each having associated therewith a control circuit which as a function of a first input signal can be activated and deactivated and in the deactivated state blocks both transistors of the associated bridge arm, and which as a function of a second input signal, in the state activated by the first input signal, can be switched over in such a way that either the upper transistor or the lower transistor is made conductive; furthermore having a microprocessor or microcontroller, hereinafter called a microprocessor, for generating the first input signal at a first output and for generating the second input signal at a second output; and having a third input signal in the form of a PWM signal with a controllable pulse duty factor, which third input signal can be conveyed to the control circuit from a PWM signal source in parallel with the second input signal and is effective only if the second output of the microprocessor is switched over into a predefined switching state.

It is thereby possible for the PWM signal to be fed in only just before the control circuit, thus greatly simplifying the circuit; the microprocessor nevertheless retains complete control over the control circuit, so that (independently of the PWM signal) it can control the upper and lower transistors of the associated bridge arm (for example when used as a charge pump), but on the other hand, after the second output of the microprocessor has switched over into the predefined switching state, allows said bridge arm to be controlled by the PWM signal, for example to control a motor parameter.

BRIEF FIGURE DESCRIPTION

FIG. 2 shows a table which depicts the output signals of the rotor position sensors and, as a function thereof, the manner in which the full bridge circuit 78 of FIG. 1 is controlled;

MOTOR

Figure 1:
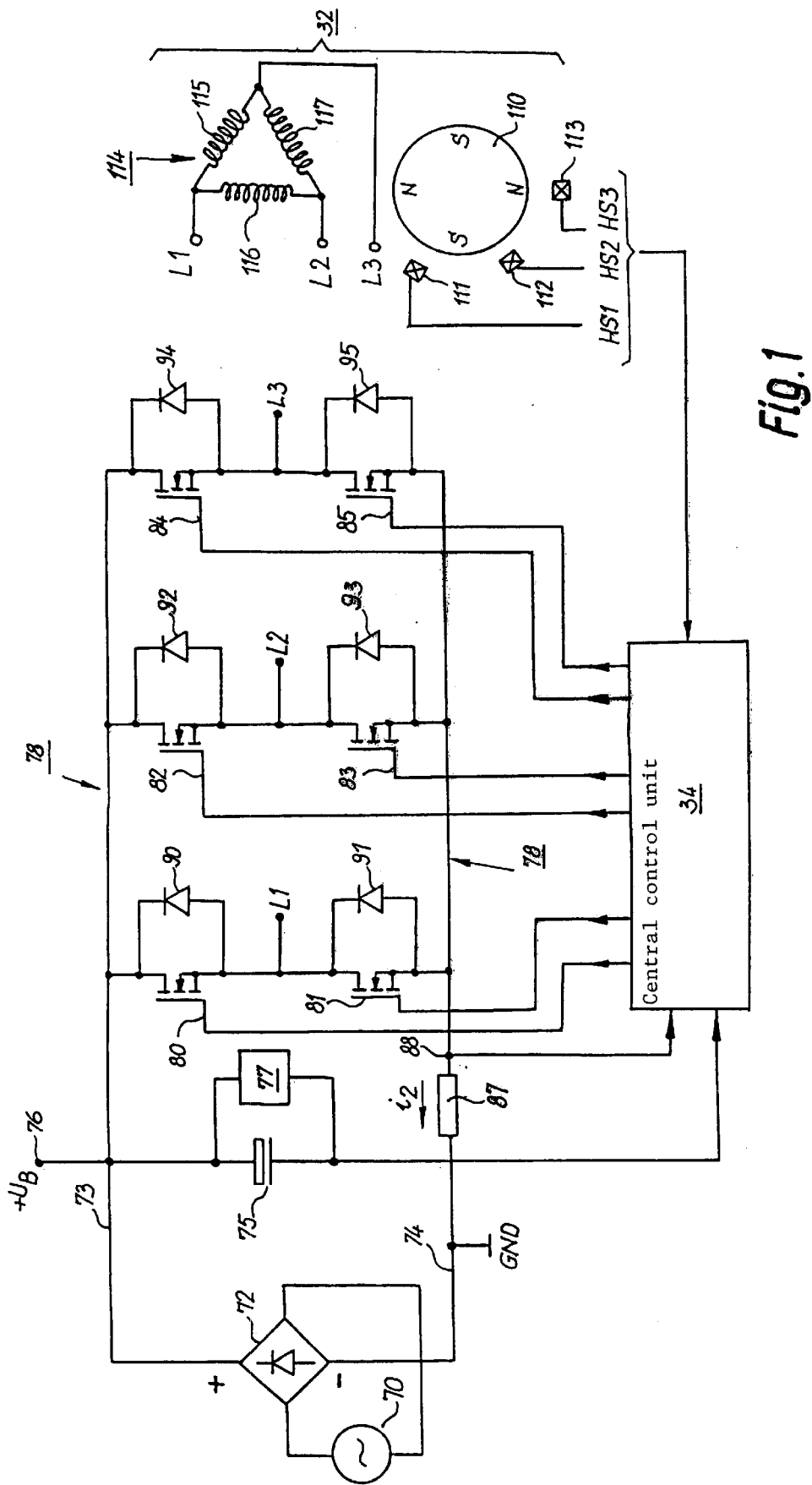
FIG. 1 shows an overview circuit diagram of a first embodiment of an electronically commutated motor according to the present invention.

FIG. 1 shows a three-phase electronically commutated motor (ECM) 32 having winding terminals L1, L2, and L3 and an output stage 78 configured as a full bridge circuit with three bridge arms.

An alternating-current voltage from an alternating-current voltage source 70 is rectified in a rectifier 72 and conveyed to a direct-current link circuit 73, 74 (DC link). A capacitor 75 smoothes the direct-current voltage $U_B$ at link circuit 73, 74 which is conveyed to the individual bridge arms of full bridge 78. This can be measured at a terminal 76. In this exemplary embodiment, N-channel MOSFETs are used as the power switches both for upper power switches 80, 82, and 84 and for lower power switches 81, 83, and 85. Free-wheeling diodes 90, 91, 92, 93, 94, and 95 are connected antiparallel with power switches 80 through 85. Free-wheeling diodes 90 through 95 are usually integrated into the associated N-channel MOSFETs. The direct-current voltage $U_B$ at link circuit 73, 74 is also conveyed to loads 77, e.g. to electronic components of motor 32.

Via the upper power switches 80, 82, and 84, the respective winding terminal L1, L2, and L3 can be connected to positive line 73; and via lower power switches 81, 83, and 85, the respective winding terminal L1, L2, and L3 can be connected to negative line 74.

Motor 32 has a central control unit 34 which switches the upper and lower power switches 80 through 85.

A measurement resistor 87 serves to measures the current $i_2$ flowing through lower bridge transistors 81, 83, and 85, based on the voltage between a point 88 and ground, and to convey it to a current limiter in central control unit 34. In the present circuit, said current $i_2$ can flow in both directions: in the direction depicted when motor 32 is consuming power, and in the opposite direction when the motor is operating as a generator and delivering power, which then flows into capacitor 75.

Motor 32 has a permanent-magnet rotor 110, a stator 114, and three galvanomagnetic rotor position sensors 111, 112, and 113. Hall sensors can be used, for example, as the galvanomagnetic rotor position sensors.

Rotor 110 is depicted as a four-pole external rotor.

The three galvanomagnetic rotor position sensors 111, 112, and 113 are arranged around rotor 110 at an angular spacing of 120° el. from one another, and serve to determine the rotor position. Rotor position sensor 111 is thus located at 0° el. (0° [mech.]), rotor position sensor 112 at 120° el. (60° [mech.]), and rotor position sensor 113 at 240° el. (120° [mech.]).

The general relationship between electrical angle $phi_{el}$ and mechanical angle $phi_{mech}$ is defined by the number of poles PZ of the rotor, as follows:

$$phi_{el} = phi_{mech} * PZ/2 \qquad (1).$$

Rotor position sensor 111 supplies a Hall signal HS1, rotor position sensor 112 a Hall signal HS2, and rotor position sensor 113 a Hall signal HS3 (see FIG. 2). Hall signals HS1, HS2, and HS3 are conveyed to central control apparatus 34, which can determine therefrom the position of the rotor and its rotation speed n.

The stator has three stator windings 115, 116, and 117, which in this exemplary embodiment are connected in triangle fashion. The stator windings are energized through output stage 78 via winding terminals L1, L2, and L3.

CONTROL LOGIC

FIG. 2 is a table which indicates the current flow through upper power switches 80, 82, and 84 (column 704) and lower power switches 81, 83, and 85 (column 702) as a function of Hall signals HS1, HS2, and HS3 (column 700) of rotor position sensors 111, 112, and 113 for one motor rotation direction. The angular range of the electrical angle $phi_{el}$ is also indicated for this purpose. The values in the columns for power switches 80 through 85 apply to a motor without alternate switching (column 706), i.e. without signal PWM2; columns EN1, EN2, EN3 and IN1, IN2, IN3 apply to a motor 32 with alternate switching (column 708), as described with reference to FIG. 3.

For example, when rotor 110 is positioned in the range 0°–60° el., the Hall signals have the values HS1=1, HS2=0, and HS3=1. The controlling of power switches 80 through 85 is determined therefrom. In the case of controlling without alternate switching, winding terminal L1 is connected via power switch 80 to positive line 73 (1 under switch 80 in FIG. 2), and winding terminal L2 is connected via power switch 83 to negative line 74 (1 under switch 83 in FIG. 2); and at winding terminal L3, both power switches 84 and 85 are open (0 under each of switches 84 and 85 0 in FIG. 2), as are power switches 81 and 82.

In the context of simple switching (see FIG. 3), a 1 under one of the lower power switches 81, 83, 85 means that the latter is switched on and off, i.e. switched off and on at a specific pulse duty factor, by means of a PWM signal.

In the context of alternate switching (see FIG. 3), a 1 under a lower power switch means that the latter is switched on and off by means of a PWM signal (FIG. 4C), and that the associated upper power switch is also switched on and off by means of the inverted PWM signal (FIG. 4B).

Simple and alternate switching are discussed in more detail with reference to FIG. 3.

Columns EN1, EN2, EN3 and IN1, IN2, IN3 determine the control of a driver module 200 (FIG. 11) which generates therefrom an alternate switching. In this context, for example, EN1=0 means that the driver module for the bridge arm to L1 is activated, and EN1=1 means that said driver module is not activated, i.e. that transistors 80 and 81 are blocked. IN1=1 means that when driver module 200 is activated, upper power switch 80 is closed; IN1=TRISTATE (TRI) means that when driver module 200 is activated, a PWM signal PWM2 alternatingly activates upper driver 210 or lower driver 212 of driver module 200, so that either transistor 80 is conductive and transistor 81 is blocked, or conversely transistor 80 is blocked and transistor 81 is conductive. This switchover is accomplished, for example, at a frequency of 20 kHz, and in its context charge is continuously pumped into capacitor 230 so that the latter always remains charged. When the driver module is switched off (e.g. EN1=1), the value of IN1 has no effect. In this case it is, however, usually set to 1, as depicted in FIG. 2.

For the example above with a rotor 110 in the range 0°–60° el., this means that the driver modules for the bridge arms of winding terminals L1 and L2 are switched on (EN1=0 and EN2=0), but the bridge arm for winding terminal L3 is switched off (EN3=1). In the case of the bridge arm for L1, upper power switch 80 is closed (IN1=1), and in the case of the bridge arm for L2, PWM signal PWM2 causes back-and-forth switching between power switches 83 and 82, as described above.

According to the control logic, at each position of rotor 110 exactly one of winding terminals L1, L2, and L3 is not energized at all, a second is at operating voltage $U_B$, and a third is being switched back and forth between positive and negative operating voltage. In the equivalent circuit diagram, it is therefore possible to omit the unenergized winding terminal and to regard stator 114 as a two-pole element. This consequently makes it possible to consider only one winding. The other windings behave in similar fashion.

Alternate Switching

Figure 3:
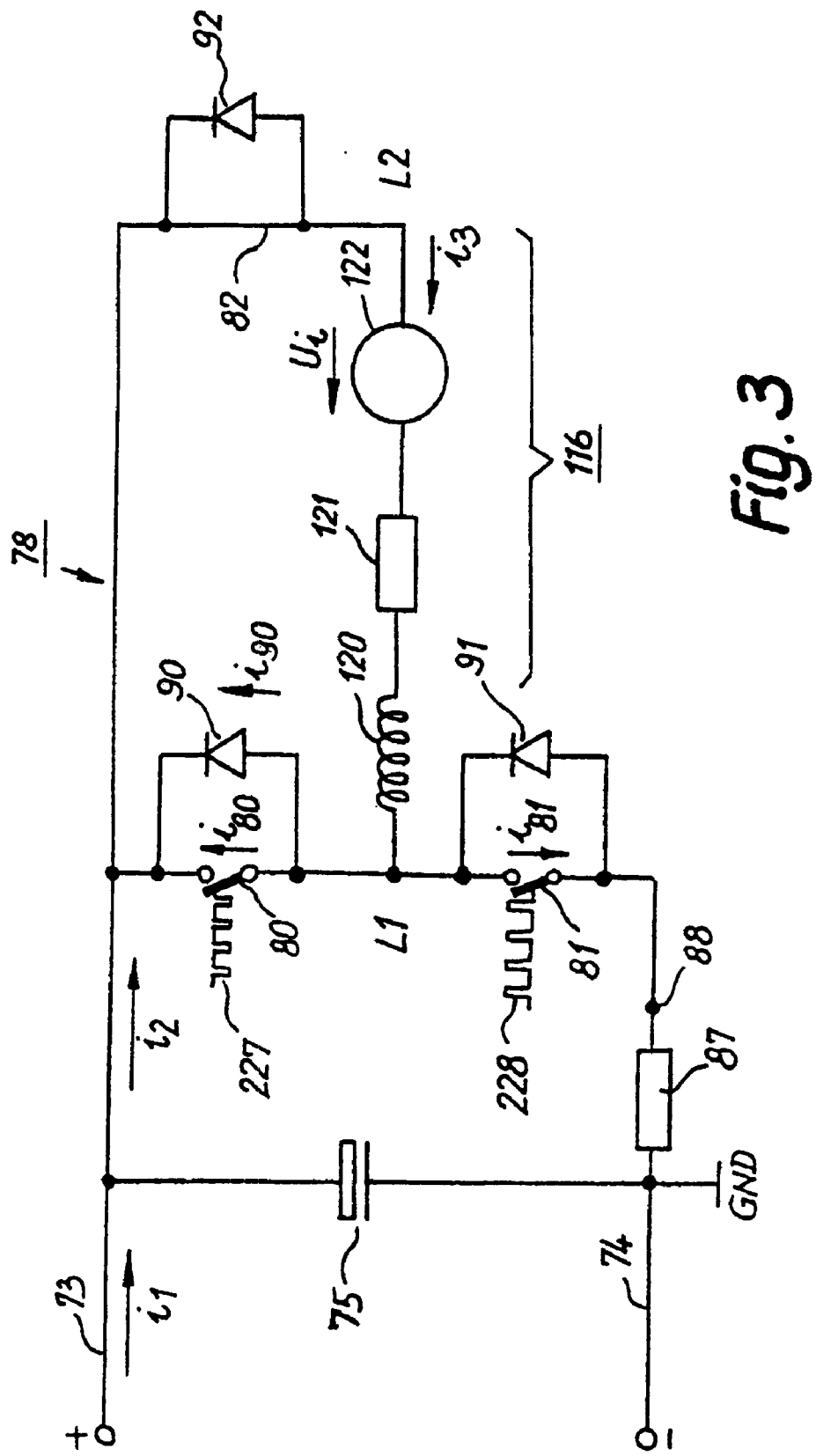
FIG. 3 shows an equivalent circuit diagram depicting only portions of full bridge circuit 78 of FIG. 1, in order better to explain the invention.
Figure 4:
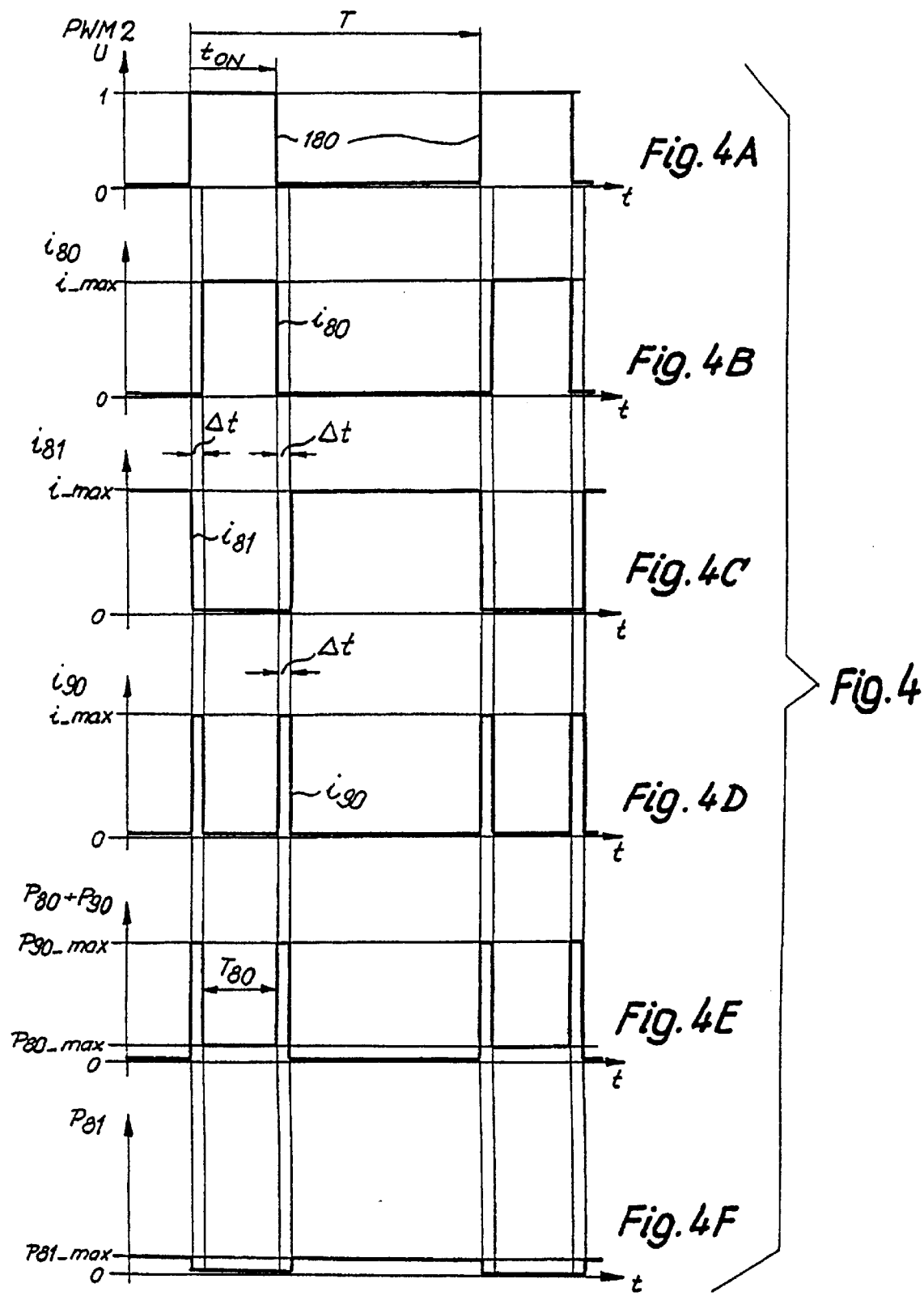
FIGS. 4A through 4F show schematic diagrams of the voltages, currents, and outputs occurring in FIG, 3 in the context of alternate switching.

FIG. 3 shows an equivalent circuit diagram with the circuit elements active for the rotor position in the range from 0° to 60° el. Parts identical to those in FIG. 1 are given identical reference characters and will not be mentioned again. Power switches 80, 81, 82 are depicted symbolically in the form of switches.

Stator winding 116 connected between L1 and L2 (with which serially connected stator windings 115 and 117 are connected in parallel, as shown in FIG. 1) is depicted as winding inductance 120, winding resistance 121, and voltage source 122 for the voltage $U_i$ induced in winding 116 upon rotation of rotor 110, which, as stated by $$U_i = n * k_e \qquad (2)$$

is proportional to the rotation speed n of the motor and to a motor constant $k_e$.

The winding current flowing through winding 116 is labeled $i_3$; the link circuit direct current $i_1$ is the smoothed current from link circuit 73, 74, and $i_2$ is the current of the output stage which is switched on and off. Upper power switch 82 is closed for a rotor position in the range 0°–60° el.

With simple switching on and switching off, lower power switch 81 is closed and opened by means of a PWM (pulse width modulated) signal 228; upper power switch 80 remains open. The motor rotation speed is controlled by means of the "pulse duty factor" $t_{ON}/T$ (FIG. 10) of PWM signal 228. When switch 81 is closed, winding current $i_3$ flows from positive line 73 through power switch 82, winding resistance 121, and winding 120 to power switch 81, and current $i_3$ is identical to current $i_2$.

If power switch 81 is opened, inductance 120 then attempts to maintain current $i_3$. Since diode 91 is nonconductive for current $i_3$, winding current $i_3$ flows through free-wheeling diode 90 and through closed switch 82. The arithmetic mean of the current $i_2$ that is switched on and off corresponds to the link circuit direct current $i_1$.

In the context of an alternately switched output stage that is preferably used here, power switch 81 is switched on and off by means of PWM signal 228, as in the case of simple switching. At the same time, power switch 80 is additionally opened by PWM signal 227 when power switch 81 is closed, and vice versa. Ignoring any dead time that may be present, PWM signal 227 thus corresponds to the inverse of PWM signal 228. More details of this are discussed in FIG. 4.

The result of alternate switching is on the one hand that free-wheeling diode 90, at which most of the power dissipation occurs with simple switching, is bypassed. The fact that current can flow in both directions in MOSFETs is exploited here. On the other hand, alternate switching makes possible a winding current $i_3$ in both directions. With simple switching, winding current $i_3$ can flow through diode 90 in only one direction (the direction driving the motor).

A winding current $i_3$ in the opposite direction causes braking of the motor.

FIGS. 4A through 4F show diagrams of the voltages, currents, and outputs occurring in FIG. 3 in the context of alternate switching.

Figure 8:
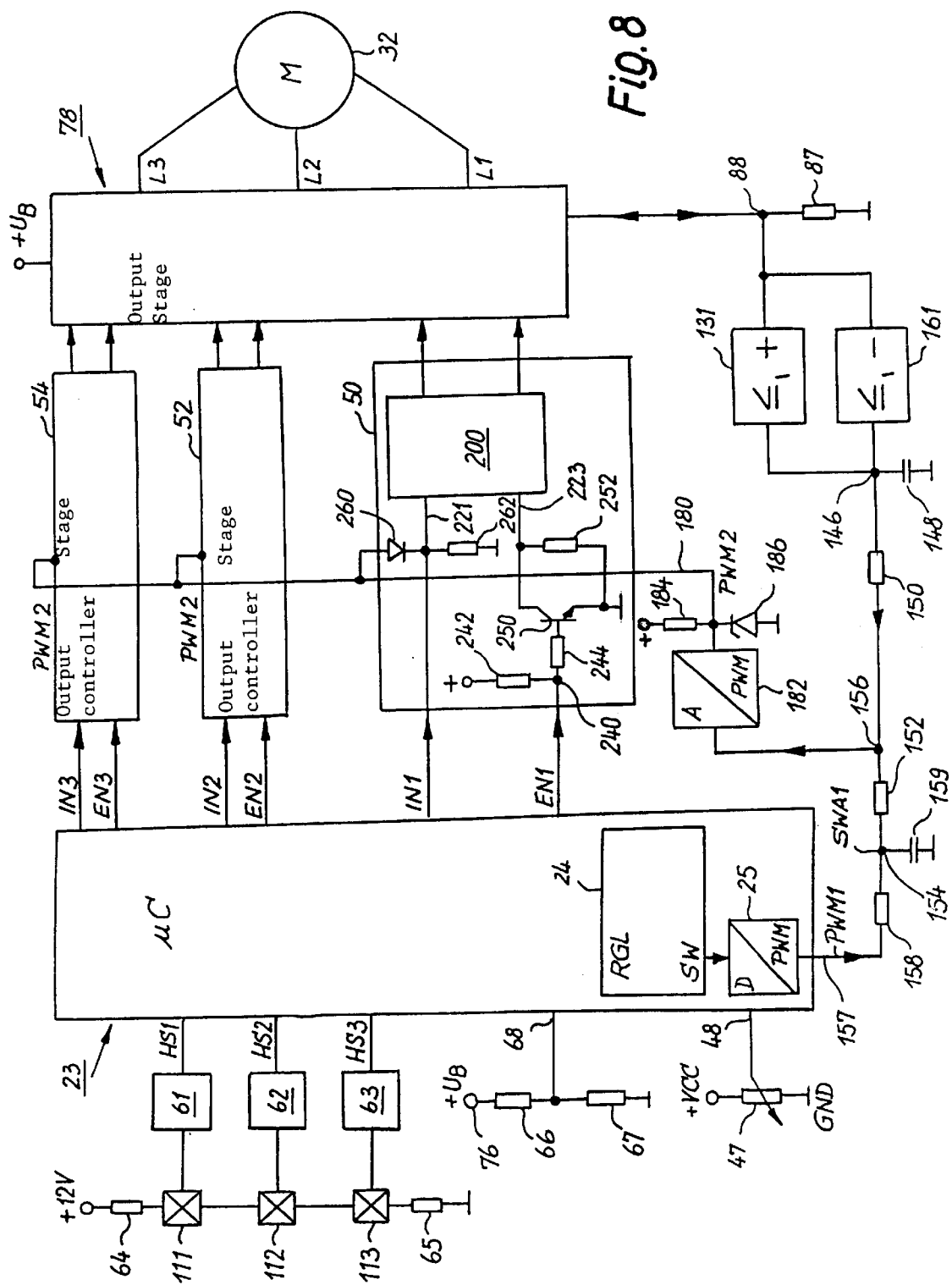
FIG. 8 shows an overview circuit diagram to explain a preferred embodiment of a motor according to the present invention.
Figure 9:
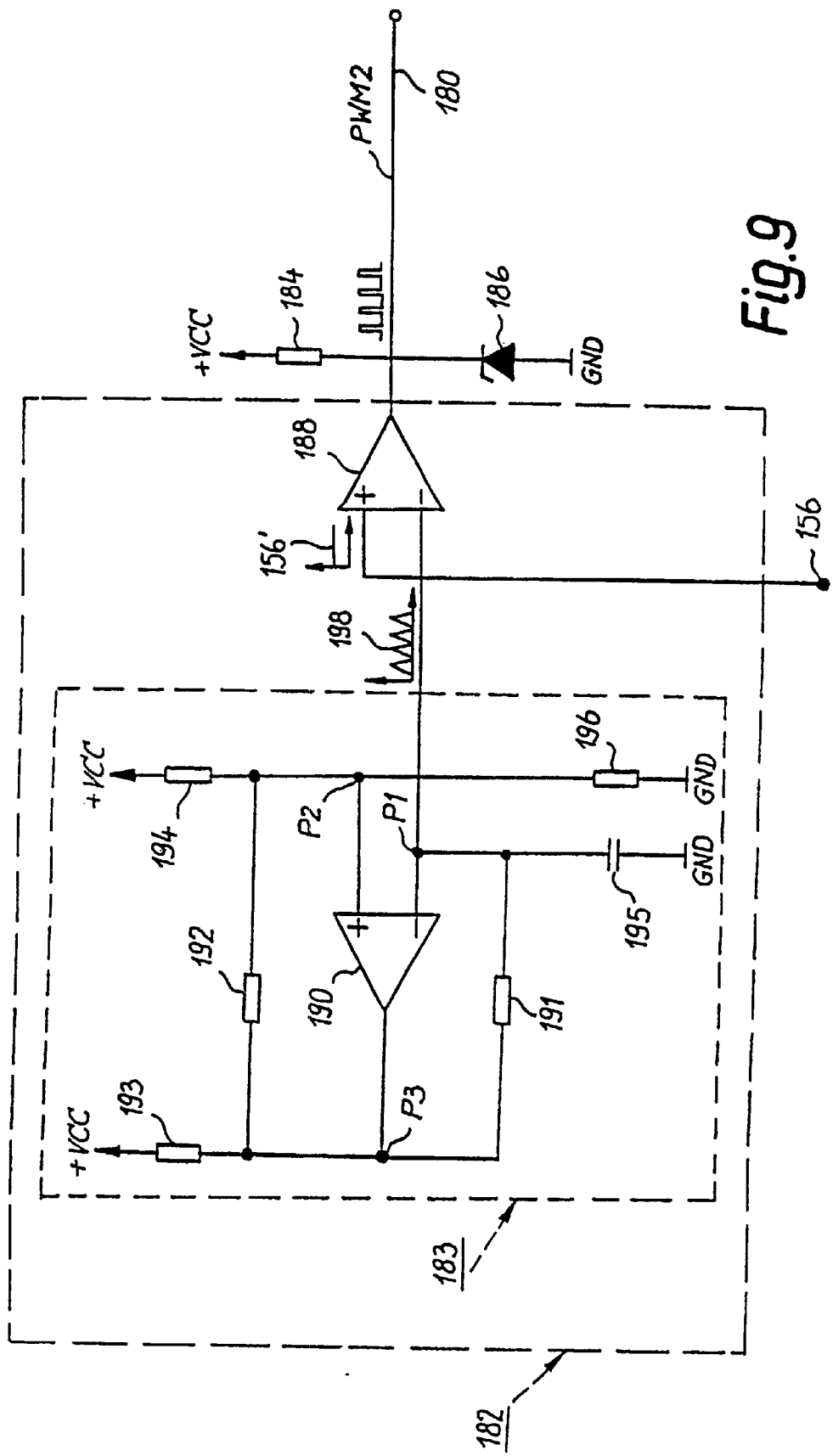
FIG. 9 is a depiction to explain an analog PWM generator that can advantageously be utilized in the context of the motor shown in FIG. 8.
Figure 11:
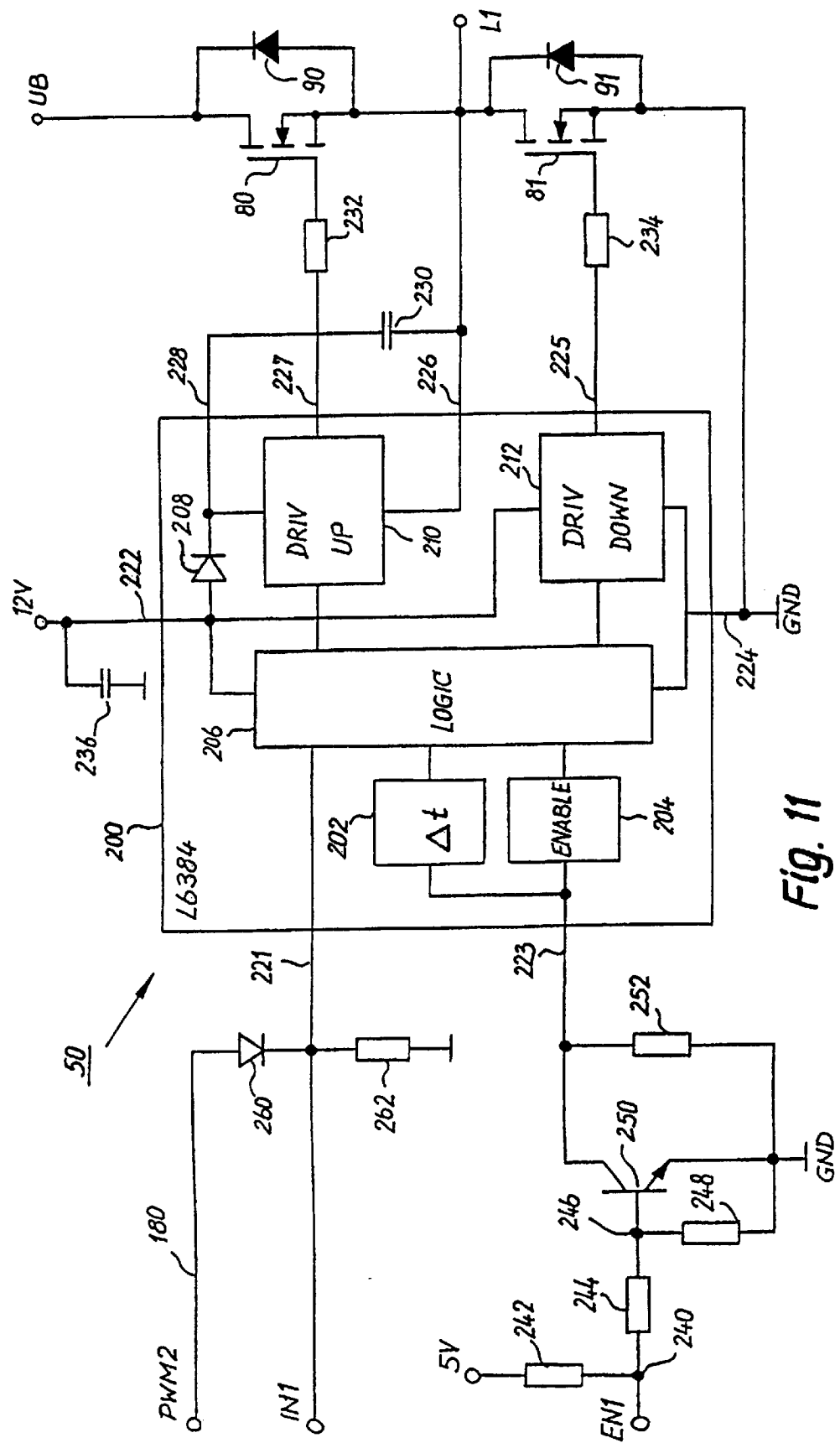
FIG. 11 is an individual depiction to explain the control of a bridge arm in the context of the arrangement of FIG. 8.

FIG. 4A shows a PWM signal PWM2 180, which has a frequency of e.g. 20 kHz and is described in more detail in FIG. 8 and FIG. 9, and with which signals 227 for controlling power switch 80 (FIG. 3) and 228 for controlling power switch 81 (FIG. 3) are generated by a driver module 200 (FIG. 11). The profiles of signals 227 and 228 are substantially mirror images of one another, i.e. when signal 227 is high, signal 228 is low; and when signal 227 is low, signal 228 is high. These signals 227, 228 are separated from one another by dead times (delta)t (e.g. 1 µs) during which both transistors 80, 81 are nonconductive. During each of these dead times, a current $i_{90}$ (FIG. 4D) flows through diode 90.

FIG. 4B schematically shows the current $i_{80}$ that flows through transistor 80, as a function of PWM signal 227, when transistor 80 is conductive and transistor 81 is open. The maximum current i_max has a value of, for example, 4 A.

FIG. 4C schematically shows the current $i_{81}$ that flows through transistor 81 as a function of PWM signal 225 when transistor 81 is conductive and transistor 80 is open. The maximum current i_max has a value of, for example, 4 A.

FIG. 4D shows the current $i_{90}$ that flows through diode 90 during each dead time (delta)t. The maximum current i_max has a value of, for example, 4 A. The reason for the presence of dead time (delta)t is that if transistor 80 and transistor 81 were conductive simultaneously, a short circuit would occur and would damage the full bridge.

FIG. 4E shows the power dissipation P80 resulting from transistor 80, and P90 resulting from diode 90. The maximum power dissipation P80_max of transistor 80 is, for example, 1 W; the maximum power dissipation P90_max of diode 90 is, for example, 6 W. Alternate switching therefore reduces the power dissipation during the time that transistor 81 is open (outside of the dead time) from 6 W to 1 W, since during time $T_{80}$ (FIG. 4E), transistor 80 with its low internal resistance (e.g. 60 mOhms) bypasses diode 90.

FIG. 4F shows the power dissipation P81 of transistor 81. The maximum power dissipation P81_max of transistor 81 is, for example, 1 W.

The "alternate switching" of transistors 80 and 81 thus eliminates most of the power dissipation caused in diode 90 in the context of simple switching. The same is true for diodes 92 and 94 in FIG. 1. The reduction in power dissipation in diodes 90, 92, 94 means less heating of the circuit components, and makes possible a more compact design.

Hardware-Based Current Limiter

Figure 5:
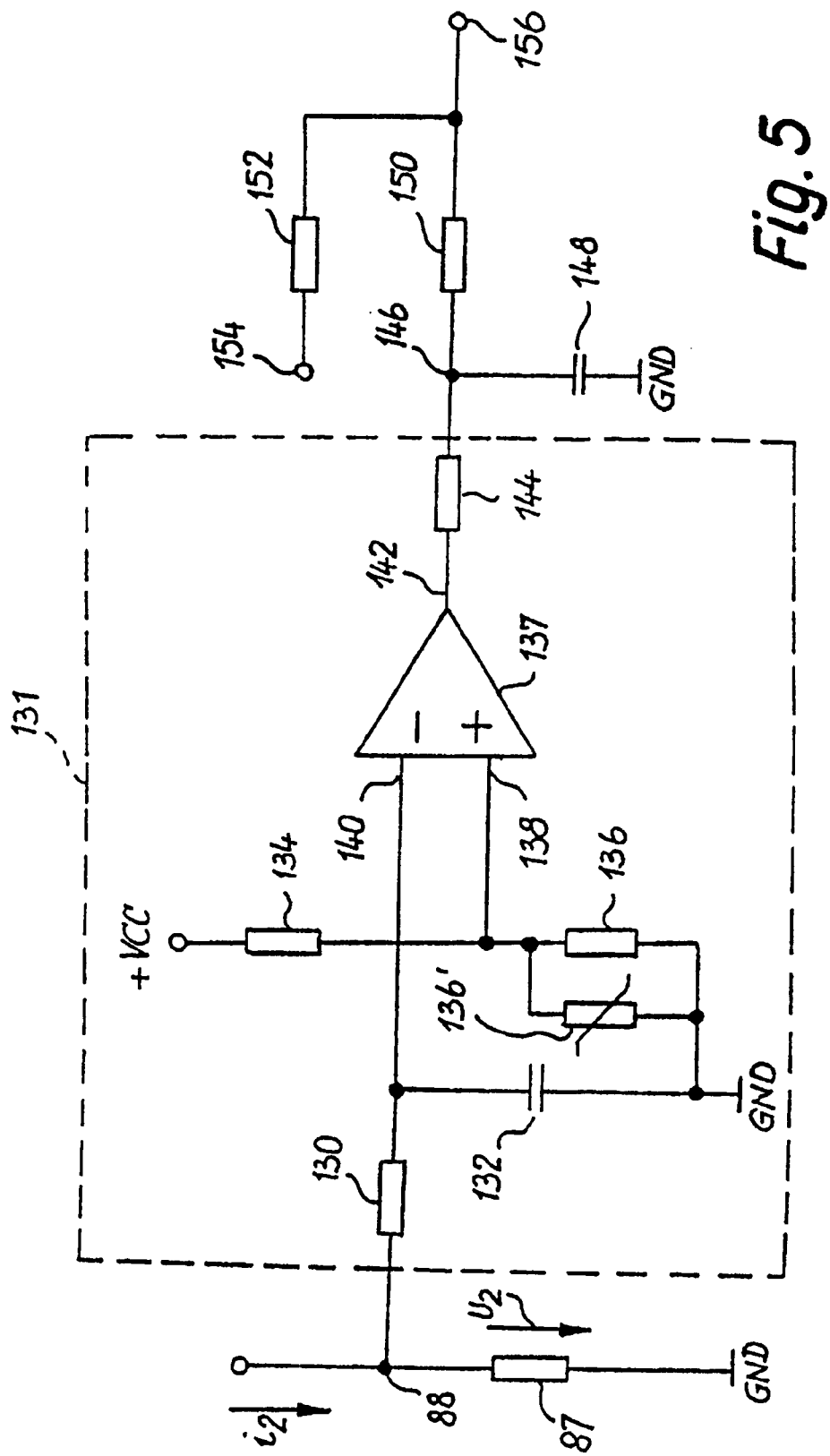
FIG. 5 shows a current limiting arrangement for limiting the drive current in the motor of FIG. 1.

FIG. 5 shows a current limiter 131 for the current $i_2$ flowing through resistor 87. This current limiter is effective only when current $i_2$ flows in the direction shown, and is therefore referred to as a "positive" current limiter. A voltage divider constituted by resistors 134 and 136 (see below regarding NTC (Negative Temperature Coefficient) resistor 136') defines at positive input 138 of a comparator 137 a potential that corresponds to the potential at point 140 for a maximum permitted current $i_2$.

If $i_2$ is less than the maximum permitted positive current, a small voltage $u_2$ then occurs at resistor 87, and the voltage present at negative input 140 of comparator 137 is less than the voltage present at positive input 138 of comparator 137. Output 142 of comparator 137 thus has a high resistance, and does not influence either a control capacitor 148 or therefore a current-limited control output at point 156. The RC element made up of resistor 130 and capacitor 132 acts as a low-pass filter for the voltage spikes occurring at resistor 87.

If, however, the current $i_2$ becomes so great that the potential at negative input 140 becomes greater than that at positive input 138 of comparator 137, output 142 of comparator 137 then switches to ground, and a discharge current flows from capacitor 148 through resistor 144 so that the voltage at capacitor 148 decreases, as does the control output at point 156.

Since resistor 150 is smaller than resistor 152 (through which the controller control output passes from point 154 to 156), the potential of point 146 takes precedence and the control output at point 156 is lowered.

Resistor 144 is smaller than resistor 152, so that current limiter 131, which charges capacitor 148, takes precedence over the control output of the controller (at point 154)

NTC resistor 136' is optional, and creates a temperature dependence in positive current limiter 131. If the temperature at NTC resistor 136' rises, its resistance then decreases, and the potential at point 138 is pulled down toward ground. This causes positive current limiter 131 to respond earlier at higher temperatures, and less heat is generated in the windings.

Figure 6:
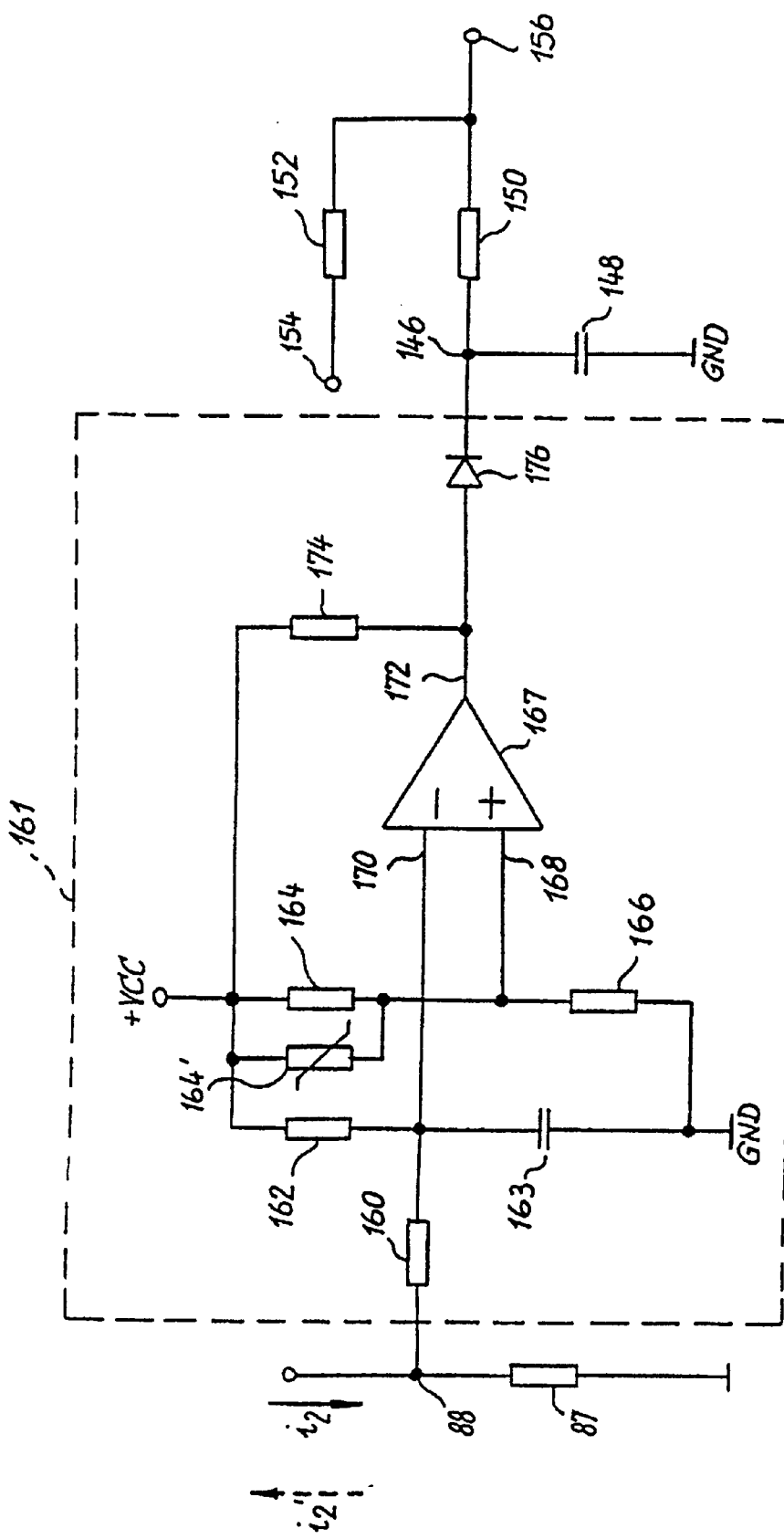
FIG. 6 shows a current limiting arrangement for limiting the braking current of the motor of FIG. 1.

FIG. 6 shows a "negative" current limiter 161. Parts identical or functionally identical to those in FIG. 5 are given identical reference characters and usually are not described again.

The purpose of the negative current limiter is to limit the braking current $i_2'$. A voltage divider constituted by resistors 164 and 166 (see below regarding NTC resistor 164') defines at positive input 168 of a comparator 167 a positive potential that corresponds to the potential at point 170 for a maximum permitted braking current $i_2'$. Resistors 160 and 162 constitute a voltage divider between the potential at point 88 and +Vcc which provides a positive potential at point 170 of comparator 167.

If the potential at point 88 is more positive than the potential PHI_min at which negative current limiting is to begin, the circuit causes the potential at negative input 170 of comparator 167 to be higher than that at positive input 168, and output 172 of comparator 167 has a low resistance. A diode 176 prevents control capacitor 148 from discharging, and the control output at point 156 remains unchanged.

As the braking current $i_2'$ increases, the potential at point 88 becomes more negative. When the voltage at point 88 becomes so negative that the potential present at negative input 170 of comparator 167 is less than the potential present at positive input 168, the resistance of output 172 of comparator 167 becomes high.

A current then flows through pull-up resistor 174 and diode 176 from +Vcc to capacitor 148, so that the voltage at capacitor 148 rises and the control output at point 156 is increased. An increase in the control output means that the pulse duty factor of PWM signal PWM2 is increased, which makes power switches 80 and 81 in FIG. 3 switch over, i.e. power switch 80 is closed for a greater percentage of the time, and power switch 81 is opened for a greater percentage of the time. The braking current $i_2'$ correspondingly decreases.

Resistor 174 is smaller than resistor 152, so that current limiter 161, which charges capacitor 148, takes priority over the control output of the controller at point 154.

An example is now provided.

At the onset of current limiting, the pulse duty factor was 50%, i.e. for 50% of the time switch 81 is closed and switch 80 is open, and for the other 50% switch 80 is closed and switch 81 is open. Dead time is ignored in this context. The onset of current limiting causes the pulse duty factor to rise to, for example, 60%. Now, for 60% of the time switch 81 is closed and switch 80 is open, and for 40% of the time switch 81 is open and switch 80 is closed. This causes the braking current to decrease accordingly.

NTC resistor 164' is optional, and creates a temperature dependence in negative current limiter 161. As the temperature at NTC resistor 164' rises, its resistance decreases, and the potential at point 138 is pulled upward toward +Vcc. As a result, negative current limiter 161 responds at lower braking currents $i_2'$, and less heat is produced in the motor windings.

Figure 22:
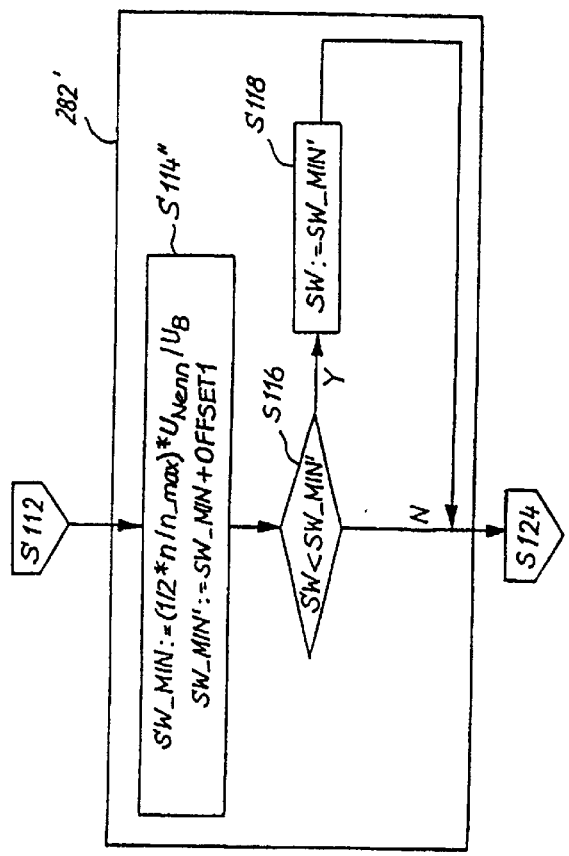
FIG. 22 shows a portion of a flow chart that can be used as a variant in the control arrangement in FIG. 16 and serves to implement FIG. 21.

With the "negative" hardware current limiter, a minimum pulse duty factor SW_MIN_CONST of, for example, 15% must be observed, since below that value the current pulse flowing through measurement resistor 87 becomes so short that a measurement would no longer be possible. This places a lower limit on the motor's rotation speed range. FIG. 22 indicates one possibility for circumventing this limitation on the rotation speed range by designing the software appropriately.

This problem does not occur with the "positive" current limiter (FIG. 5) because only a low drive current $i_2$ occurs at a very low pulse duty factor. Large braking currents $i_2'$ can, however, occur at a low pulse duty factor if the rotation speed n of motor 32 is too high.

Figure 7:
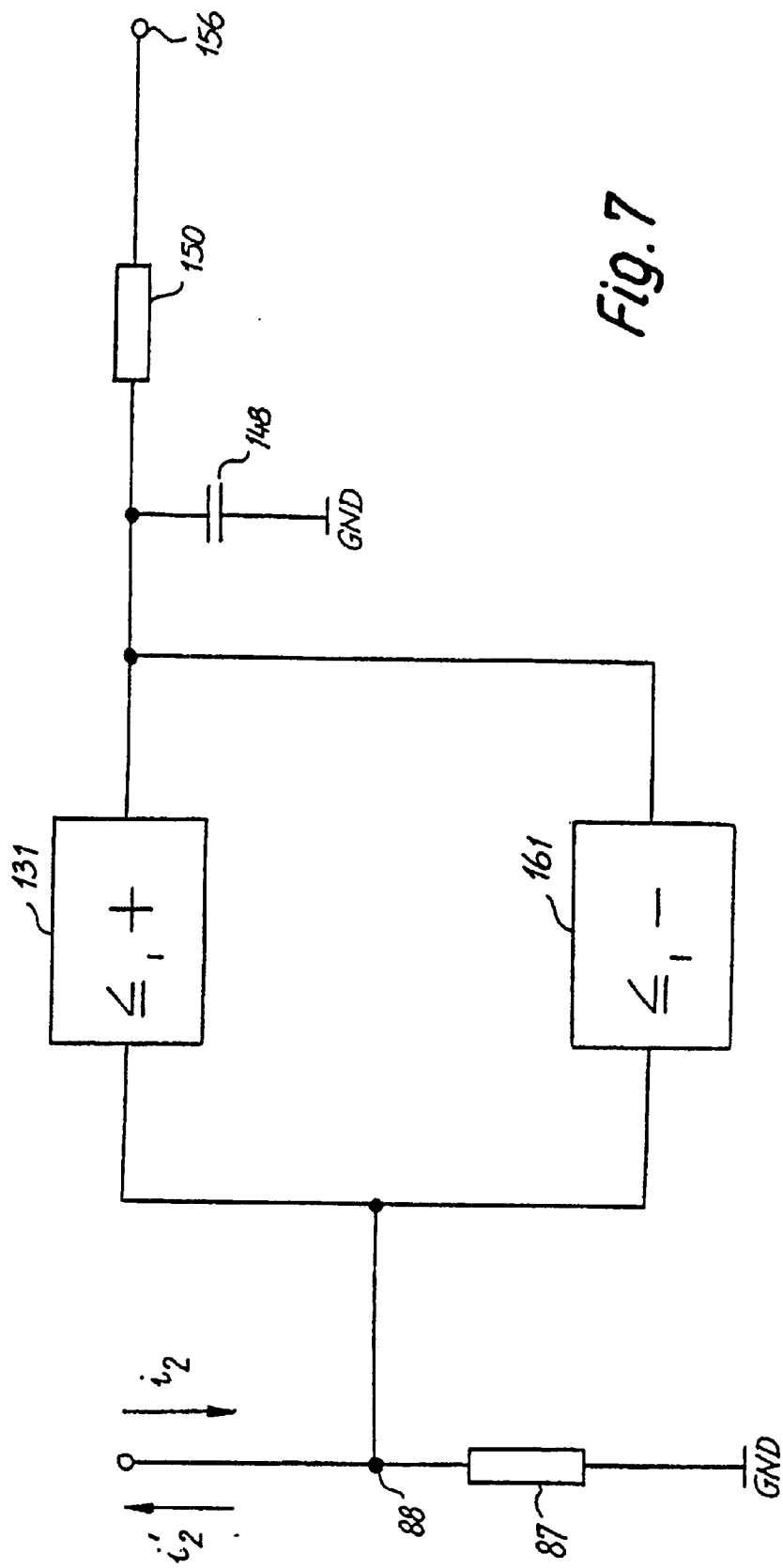
FIG. 7 depicts a combined current limiting arrangement for limiting drive current and for limiting braking current in a motor of FIG. 1.

FIG. 7 shows a combination of a "positive" current limiter 131 (FIG. 5) and "negative" current limiter 161 (FIG. 6). Measurement resistor 87 is connected as in FIGS. 5 and 6. The potential at point 88 is conveyed both to positive current limiter 131 and to negative current limiter 161. The outputs of current limiters 131 and 161 are both connected to capacitor 148. Thus if the motor current $i_2$ is too high, positive current limiter 131 can discharge capacitor 148; and if the braking current $i_2'$ is too high, the negative current limiter can charge capacitor 148. The voltage at capacitor 148 determines, via resistor 150, the control output at point 156.

Overview (FIG. 8)

FIG. 8 is an overview of a preferred exemplary embodiment of an electronically commutated motor 32 according to the present invention.

Electric motor 108 has a microprocessor or microcontroller 23, hereinafter called µC 23 (e.g. PIC16C72A of Microchip).

Via an analog input 48, µC 23 receives an analog rotation speed setpoint definition, which is provided by a potentiometer 47 connected as a voltage divider and is digitized by an A/D converter in µC 23 and converted into a rotation speed setpoint n_s. The rotation speed setpoint definition could also be transmitted to electric motor 32, for example, by means of a frequency or a digital value.

Operating voltage $U_B$ of motor 32 is picked off at point 76 (FIG. 1) and conveyed to µC 23 via two resistors 66, 67 at analog input 68; from there, that value is digitized by an A/D converter in µC 23. Resistors 66 and 67 transform the operating voltage $U_B$ at point 76 into a range suitable for the A/D converter of µC 23. Operating voltage monitoring is performed by µC 23, i.e. the voltage at capacitor 75 (FIG. 1) is monitored and is analyzed in µC 23 in order to control motor 32 correspondingly.

Figure 12:
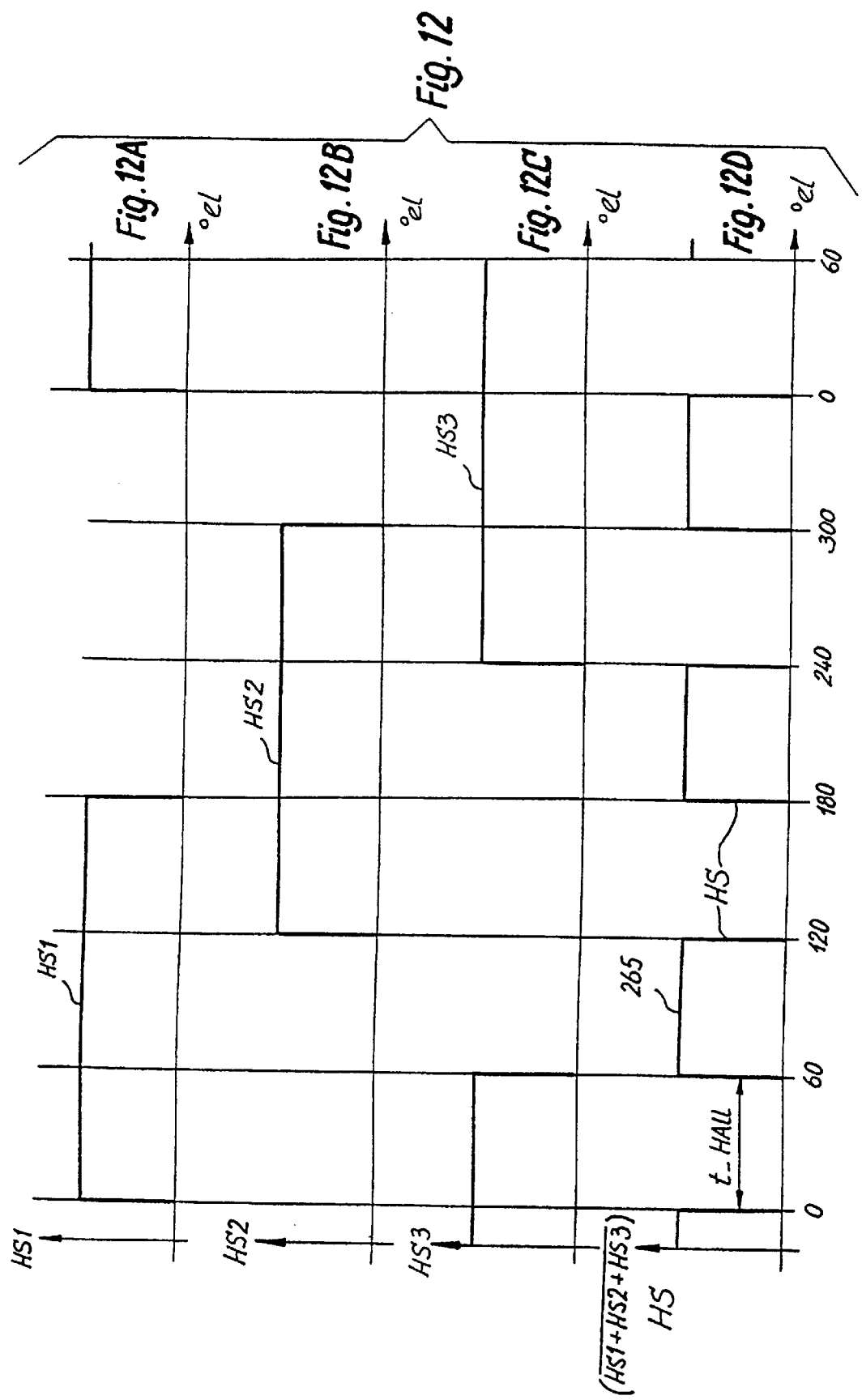
FIG. 12 shows the output signals of rotor position sensors 111, 112, 113 of FIG. 1, and a combined rotor position signal that is assembled from those rotor position signals.

The position of rotor 110 (FIG. 1) is sensed by means of three serially connected rotor position sensors 111, 112, and 113 mounted in its vicinity, which are connected through a resistor 64 to +12 V and through a resistor 65 to ground (GND). The signals of rotor position sensors 111, 112, and 113 are conditioned in rotor position signal conditioners 61, 62, and 63 and conveyed to µC 23 as Hall signals HS1, HS2, and HS3 that are depicted in FIG. 12.

µC 23 controls an output stage controller 50 via outputs EN1 and IN1, an output stage controller 52 via outputs EN2 and IN2, and an output stage controller 54 via outputs EN3 and IN3.

Output stage controllers 50, 52, and 54 control the bridge arms in output stage 78 for winding terminals L1, L2, and L3 through which the motor windings of motor 32 are energized. The rotation speed of the motor is controlled by way of the pulse duty factor of a PWM signal PWM2 180 that is fed into output stage controllers 50, 52, and 54. Signal PWM2 180 is generated in a PWM generator 182, with a pulse duty factor that is determined by an analog control output, namely the potential at point 156. A Zener diode 186 limits the voltage of signal PWM2 180, and a resistor 184 serves as pull-up resistor for the open-collector output of PWM generator 182.

The analog control output of PWM generator 182, i.e. the potential at point 156, is determined both by a rotation speed controller 24 in µC 23 and by current limiters 131 and 161, the latter having priority.

Rotation speed controller 24 in µC 23 calculates a digital control output SW that is transferred to an internal PWM generator 25 of µC 23, which generates therefrom, at an output 157 of µC 23, a PWM signal having a pulse duty factor PWM1 that depends on the control output SW. An RC element comprising a resistor 158 and a capacitor 159 smoothes signal PWM1 into a substantially constant analog signal SWA1 at capacitor 154. With the aid of the PWM generator in μC 23 and RC element 158, 159, controller 24 in μC 23 therefore outputs an analog control output SWA1.

If no current limiting is performed by current limiter 131 or 161, the small capacitor 148 which determines the potential at point 156 is then charged through resistors 152 and 150 to the potential of point 154. With no active current limiter 131 or 161, the potential at point 156 is determined solely by controller 24.

If positive current limiter 131 (FIG. 5) or negative current limiter 161 (FIG. 6) is active, however, capacitor 148 (e.g. 330 pF) is then charged or discharged as already described. Resistor 150 can be very small, and preferably even has a value of 0 Ohms.

As capacitor 148 is being charged or discharged, the hardware current limiter takes precedence over the rotation speed controller, since resistor 144 (e.g. 3.9 kohms) for charging capacitor 148 (FIG. 5), and pull-up resistor 174 (e.g. 10 kOhms) for charging capacitor 148 (FIG. 6), are much smaller than resistor 152 (e.g. 220 kohms).

After completion of a current limiting operation, the smaller capacitor 148 is charged back up to the potential of point 154. Capacitor 159 has, for example, a value of 10 nF.

PWM Signal Generator

FIG. 9 shows a preferred circuit for PWM generator 182. Parts that are identical or functionally identical to those in previous Figures are labeled with the same reference characters as therein, and usually are not described again.

The current-limited control output 156', in the form of the potential at point 156 (FIG. 8), is present at the positive input of a comparator 188. A triangular signal 198 generated by a triangular oscillator (sawtooth oscillator) 183 is present at the negative input of comparator 188 (FIG. 9).

Triangular oscillator 183 comprises a comparator 190. From output P3 of comparator 190, a positive feedback resistor 192 goes to its positive input; similarly, a negative feedback resistor 191 leads from output P3 of comparator 190 to the negative input of comparator 190. A capacitor 195 is located between the negative input of comparator 190 and ground. The output of comparator 190 is also connected through a resistor 193 to +Vcc. The positive input of comparator 190 is connected through two resistors 194 and 196 to +Vcc and to ground, respectively.

The reader is referred to DE 198 36 882.8 (corresponding to μCT/EP99/05186 & U.S. Ser. No. 09/720,221) for an explanation of the manner of operation of triangular generator 183.

If the potential of triangular signal 198 at the negative input of comparator 188 is less than that of the current-limited control output 156' at the positive input of comparator 188, the output of comparator 188 is then high-resistance, and pull-up resistor 184 pulls line PWM2 180 up to HIGH. If the voltage of triangular signal 198 is greater than that of reference signal 156', the output of comparator 188 is then low-resistance, and PWM signal PWM2 180 is LOW. Zener diode 186 limits the voltage of PWM signal PWM2 180.

If an inverted PWM signal is needed, the positive and negative inputs of comparator 188 are transposed.

FIG. 10A shows triangular signal 198 and control output 156' at point 156, and FIG. 10B shows PWM signal PWM2 180 resulting from FIG. 10A.

Triangular signal 198 from triangular generator 183 is shown in idealized fashion. In reality it does not have a perfect triangular shape, although this changes nothing in terms of the manner of operation of PWM generator 182 of FIG. 9. Triangular signal 198 has an offset 199 from the 0 V voltage. only when it lies above offset 199, therefore, does control output 156' result in a pulse duty factor greater than zero.

The pulse duty factor TV of signal PWM2 is the ratio between the $t_{ON}$ time of PWM signal PWM2 180 during one period of the triangular signal at HIGH, and an entire period T of triangular signal 198 (cf. FIG. 10B). The following applies:

$$TV = t_{ON}/T \quad (3)$$

Pulse duty factor TV can be between 0% and 100%. For example, if the motor rotation speed is too high, the potential at point 156 is lowered and pulse duty factor TV is thus made smaller, as depicted in FIG. 1A. The entire procedure is called pulse width modulation (PWM). For greater clarity, the pulse duty factors are labeled PWM1 and PWM2.

Output Stage Control

FIG. 11 shows output stage controller 50 for winding terminal L1. The other output stage controllers 52 and 54 are of identical construction.

Output stage controller 50 switches upper power switch 80 and lower power switch 81 on the basis of signals EN1, IN1 in conjunction with PWM signal PWM2 180.

In this exemplary embodiment, an L6384 driver module 200 of the SGS-Thomson company is used.

Driver module 200 has a dead-time generator 202, an enable logic unit 204, a logic unit 206, a diode 208, an upper driver 210, a lower driver 212, and terminals 221 through 228.

μC 23 (or, for example, a simpler logic circuit) is connected to terminals EN1 and IN1 (cf. FIG. 8).

If line EN1 is at HIGH or TRISTATE, a transistor 250 switches on and becomes low-resistance. This bypasses a resistor 252 which, as explained below, determines a dead time of driver module 200, thus causing input 223 to become low-resistance. The result is to switch off upper driver 210 and lower driver 212, and therefore also the bridge arm with power switches 80, 81. Signal IN1 has no influence on driver module 200. Via transistor 250, μC 23 receives control over driver module 200 and thus also over winding terminal L1.

If line EN1 is set to LOW, transistor 250 is blocked and high-resistance. A constant current from driver module 200 flows through resistor 252 (e.g. 150 kOhms) to ground. This generates at resistor 252 a voltage that is present at input 223. If this voltage is greater than, for example, 0.5 V, driver module 200 is activated. If transistor 250 is conductive, on the other hand, this voltage drops to practically zero, and driver module 200 is deactivated. The voltage at input 223 serves at the same time to set the dead time.

In the event of a reset at μC 23, all the inputs and outputs of μC 23 are high-resistance (i.e. including IN1 and EN1). In this case transistor 250 is switched on via resistors 242 and 244, and driver module 200 is therefore switched off. This provides additional security.

A circuit without transistor 250 or resistors 242, 244, and 248 would theoretically also be possible. In this case signal EN1 would need to be set to TRISTATE to switch driver module 200 on, and to LOW to switch it off. As discussed above, however, a reset of μC 23 would cause the inputs of μC 23 to become high-resistance, and driver module 200 and thus also the respective bridge arm would be switched on; this could result in uncontrolled switching states, and is not desirable.

When driver module 200 is activated (EN1=LOW), it is possible to establish via input 221 whether upper power switch 80 or lower power switch 81 is to be made conductive.

If input 221 is LOW, then lower driver 212 is switched on and power switch 81 is closed; upper power switch 80 is open.

If input 221 is HIGH, however, then exactly the opposite occurs: upper power switch 80 is closed and lower power switch 81 is open.

At each change in the signal at input 221 of driver module 200, deadtime generator 202 introduces a dead time during which both drivers 210 and 212 are switched off so that short circuits do not occur in the individual bridge arms. The dead time can be adjusted by way of the size of resistor 252, and is, for example, 1 µs.

When the driver module is activated (EN1=0), output IN1 can be used in three different ways.

When IN1=TRISTATE, PWM signal 180 is transferred in via diode 260 on a priority basis, and this signal causes alternate switching on and off, at the pulse duty factor PWM2 of PWM signal 180, of bridge arm 80, 81 that is depicted. Resistor 262 pulls the voltage at input 221 to 0 V when the PWM signal is LOW, since this is not possible via diode 260. When IN1=TRISTATE, PWM signal 180 therefore takes precedence over output IN1 of µC 23.

Setting IN1 to HIGH causes µC 23 to switch on upper driver 210 of driver module 200. The signal of output IN1 takes precedence over the PWM signal when IN1=1, i.e. PWM signal 180 then has no effect.

Setting IN1 to LOW causes µC 23 to switch on lower driver 212 of driver module 200. Here as well, the signal of output IN1 takes precedence over the PWM signal, which here again therefore has no effect. Signal IN1 is set to zero only when pumping via µC 23 occurs, i.e. driver module 200 can be controlled in such a way that the bridge transistors serve as a charge pump.

Because of the fact that PWM signal PWM2 180 is transferred in via diode 260 together with resistor 262, µC 23 can determine whether signal PWM2 180 should take precedence for the control of input 221 of driver module 200. If signal PWM2 180 is to take precedence, µC 23 then sets IN1 to TRISTATE. µC 23 takes precedence, however, if it sets IN1 to HIGH or LOW.

A special aspect of this circuit is the fact that PWM signal PWM2 180 is transferred in so shortly before driver 200, and µC 23 nevertheless retains control over the driver module. The commutation logic is first calculated and output, and only then is PWM signal PWM2 180 transferred in.

A capacitor 230, and diode 208 integrated into driver module 200, constitute a "bootstrap" circuit. The bootstrap circuit is necessary if N-channel MOSFETs are used for the aforementioned upper power switch 80, since they require a control voltage which is greater than the voltage being switched (in this case $U_B$).

If power switch 81 is closed, winding terminal L1 is then at ground, and capacitor 230 is charged through diode 208 to +12 V, as depicted in FIG. 11. If power switch 81 is switched off and power switch 80 is switched on, the upper driver then has available to it, via input 228, a voltage which is 12 V higher than the voltage of winding terminal L1. Upper driver 210 can thus switch on upper power switch 80 as long as capacitor 230 is charged.

Capacitor 230 must therefore be charged at regular intervals; this is referred to as "pumping." This principle is known to those skilled in the art as a "charge pump." Pumping is monitored and controlled by µC 23.

Two resistors 232 and 234 limit the maximum driver current for transistors 80, 81, and a capacitor 236 supplies a briefly high current necessary for driver module 200.

Pumping

In the context of the circuit shown in FIG. 11, if lower driver 212 is not switched on for a long time, capacitor 230 will then discharge and upper driver 210 can no longer close upper power switch 80.

When motor 32 is in normal operation (in one specific direction), FIG. 3 shows that one bridge arm is always being alternately switched on and off. This happens so frequently that sufficient pumping is guaranteed, and capacitor 230 is always sufficiently charged.

If motor 32 is very slow or stationary, however, sufficient pumping is no longer guaranteed. This situation can be monitored on the basis of the Hall time t_HALL (FIG. 12), i.e. the time between two successive changes in Hall. signal HS (FIG. 12D). If the Hall time exceeds, for example, 10 ms, repumping is necessary.

Another situation in which Hall alternations take place but sufficient pumping is not guaranteed is an oscillation of the motor about a rest position, for example because rotor 110 is jammed. It may happen, for example, that rotor 110 constantly moves back and forth between two regions in which alternate switching on and off takes place only at winding terminal L1 or L2. In this situation, L3 must be pumped.

In this second situation, sufficient pumping can be guaranteed by pumping each time motor 32 changes direction. The change in direction is detected in the commutation routine via rotor position sensors 111, 112, and 113. when a direction change occurs, flag FCT_PUMP (S206 in FIG. 13, S602 in FIG. 25) is set to 1. This informs the main program in µC 23 (FIG. 25) that pumping should occur. Execution then branches to S210 in FIG. 13.

Figure 25:
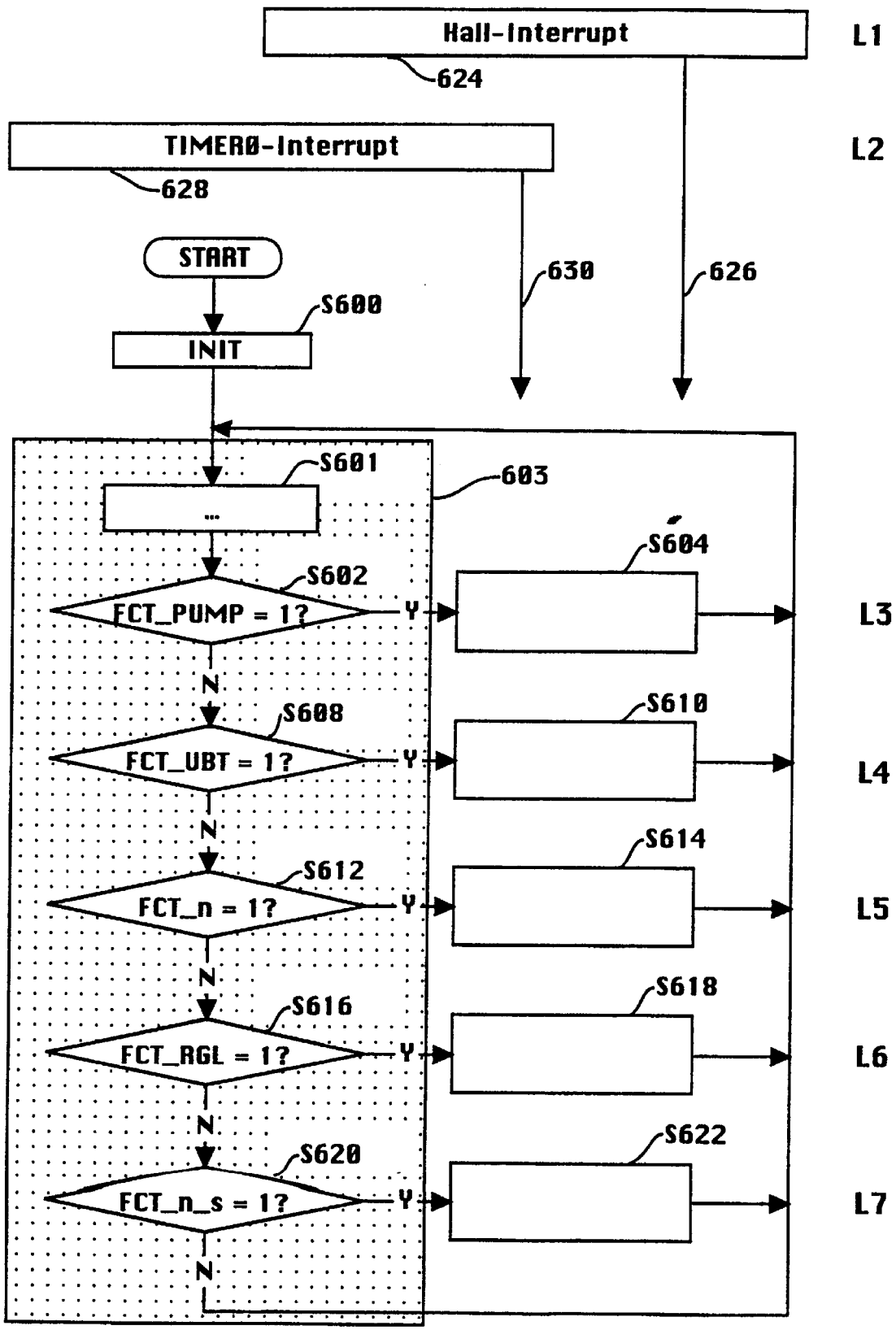
FIG. 25 shows a function manager that can preferably be used in the context of a motor according to the present invention.

If FCT_PUMP=1, function manager 600 (FIG. 25) then calls a pump function $604 (FIG. 25). In pump function S604, all the lines EN1, IN1, EN2, IN2, EN3, IN3 of µC 23 are set to LOW for a period of approximately 15 to 20 µs. This causes lower power switches 81, 83, and S5 to switch on and upper power switches 80, 82, 84 to switch off, so that all the output stage controllers 50, 52, and 54 are pumped, After pumping, the output stage controllers are activated again in accordance with the stored Hall signals HS1, HS2, and HS3, as described with reference to FIG. 1 and FIG. 2.

FIG. 12 shows the creation of a Hall signal HS 265 as the sum or antivalence of Hall signals HS1, HS2, and HS3 of rotor position signals ill, 112, and 113. Hall signal HS 265 changes each time Hall signals HS1, HS2, and HS3 change from HIGH to LOW or LOW to HIGH, so that Hall signal HS 265 changes every 60° el.=30° mech.

The rotation speed n of rotor 110 can be measured on the basis of the Hall time t_HALL (FIG. 12D) between two Hall changes.

Since one electrical revolution (360° el.) corresponds, in this exemplary embodiment, to six Hall changes, 12 Hall changes occur for each mechanical revolution. The equation governing the true rotation speed n is $$n=1/(12 \times t\_HALL) \tag{4}$$

Figure 13:
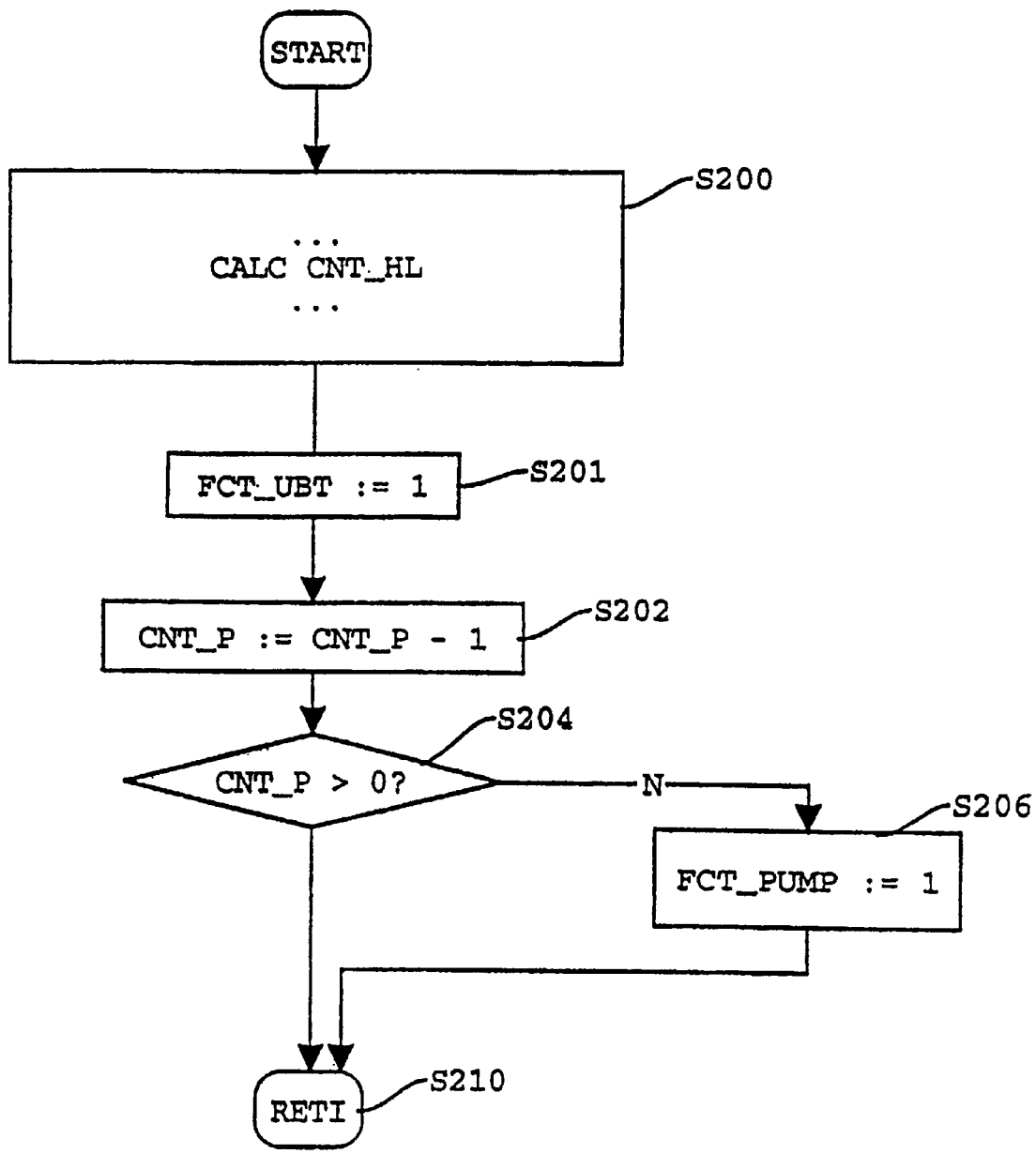
FIG. 13 is a flow chart showing the sequences for so-called pumping in the context of a motor according to the present invention.

FIG. 13 shows a flow chart of a TIMER0_ROUT interrupt routine in which pumping is requested if the rotation speed of rotor 110 is too low.

The TIMERØ_ROUT interrupt routine is called by a timer interrupt that is generated at regular intervals by a timer integrated into µC 21. Timer TIMERØ is, for example, one byte (256 bits) wide; at a processor frequency of 10 MHz and a prescale of 8, it reaches a value of 0 every 256×8×0.4=820 µs, and a timer interrupt is initiated. The 0.4 µs is derived from the fact that at a processor frequency of 10 MHz, one cycle requires 0.1 µs, and for each instruction the processor requires four cycles and thus 0.4 µs. Timer TIMERØ also obeys this.

S200 represents all the other steps that execute in the TIMERØ_ROUT interrupt routines Timer TIMERØ also, for example, increments a ring counter CNT_HL that is used to calculate the Hall time t_HALL.

In S201, monitoring of the operating voltage $U_B$ (FIG. 23) is requested by setting a variable FCT_UBT to 1.

In S202, a counter CNT_P is decremented by one.

In S204, CNT_P is checked. Execution branches to S210 if CNT_P>0, and otherwise to S206.

In S206, the value FCT_PUMP is set to 1. This informs the main program in µC 23 (FIG. 25) that the pump function S604 (FIG. 25) needs to be called. Execution then branches to S210.

In S210, execution leaves the TIMERØ_ROUT interrupt routine.

Figure 14:
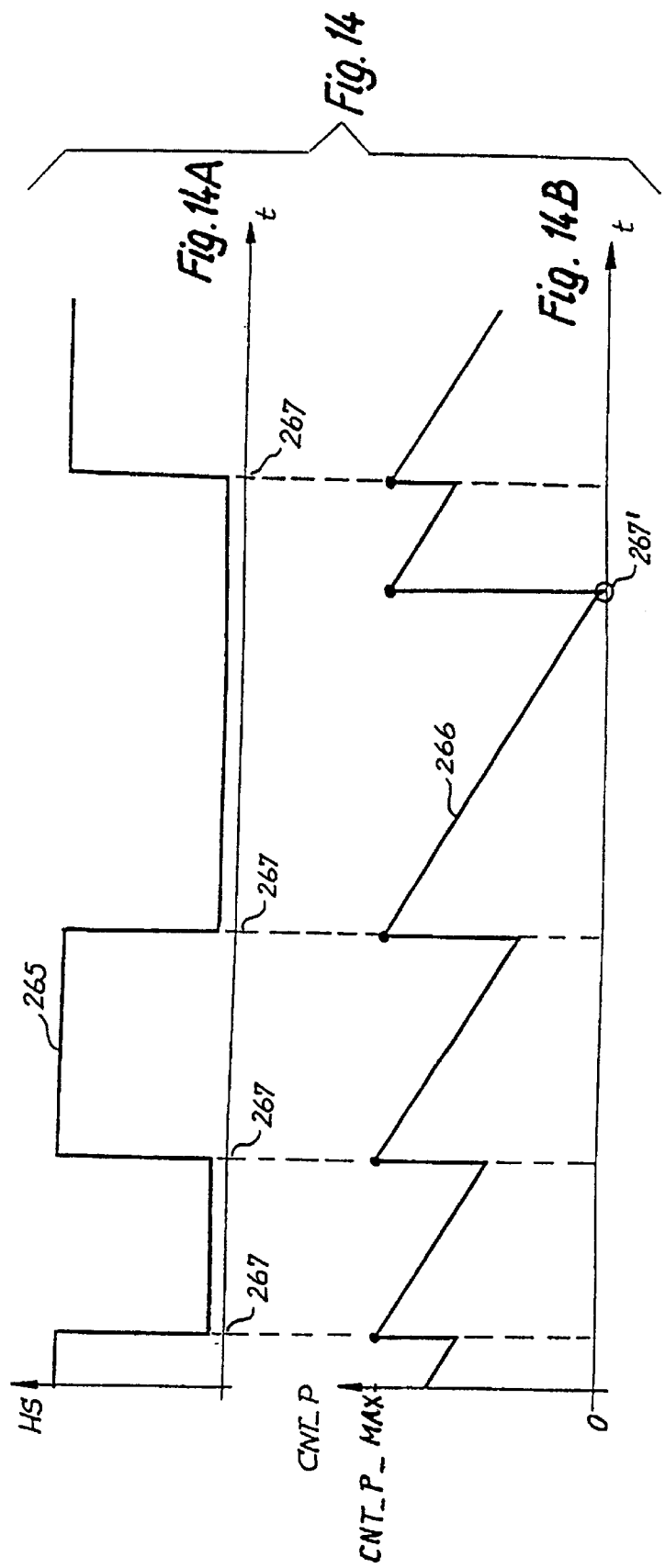
FIGS. 14A and 14B show diagrams to explain the manner of operation of FIG. 13.

FIG. 14A and FIG. 14B show a pump monitoring function implemented using the TIMERØ_ROUT timer interrupt routine (FIG. 13). In the top diagram, Hall signal HS 265 is plotted against time t; below, the value 266 of pump counter CNT_P is plotted against time t. At each change 267 in Hall signal HS, pump counter CNT_P is set to the value CNT_P_MAX (e.g. CNT_P_MAX=11). It is then counted down in the TIMERØ_ROUT interrupt routine.

If counter CNT_P does not reach zero, the motor rotation speed is sufficiently fast and pumping is guaranteed.

Figure 15:
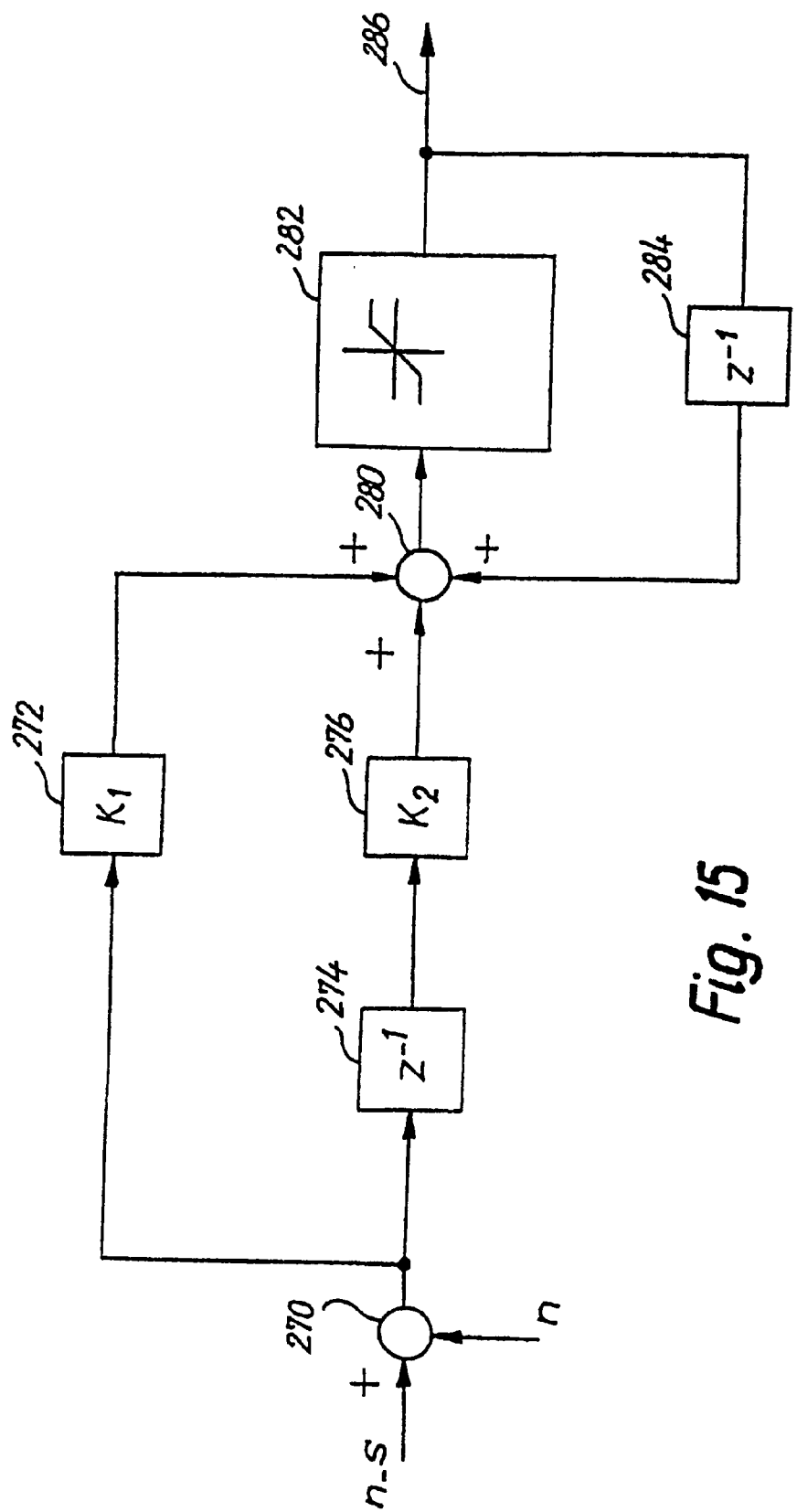
FIG. 15 is a schematic depiction to explain the manner of operation of a digital rotation speed control arrangement that can be used with particular advantage in the context of the present invention.

If counter CNT_P does reach a value of zero, however, e.g. at point 267, the TIMERØ_ROUT interrupt routine then requests pumping by µC 23. For an initial value CNT_P_MAX=11, counter CNT_P reaches zero in 11×820 µs=9 ms. Pumping therefore occurs at least every 11×820 µs=9 ms Controller FIG. 15 shows an exemplary embodiment of controller 24 in µC 23 as a PI controller.

At a point 270, the present system deviation (n_s—n) is calculated as the difference between the rotation speed setpoint n_s and actual rotation speed n.

At a point 280, three weighted values are added. The first of these is a present system deviation weighted with Kl (e.g. K1=30.38).

The second of these is an old system deviation weighted in 276 with K2 (e.g. K2=−0.62). $Z^{-1}$ in 274 means in this context that the previous value from 270 is to be used.

Thirdly, an old control value is added via 284 to 280. What results from this is a so-called anti-windup that improves controller 24 in µC 23.

The result from summing element 280 is limited in 282 and lastly output as a control value in 286.

In this example, the values for K1 and K2 are $$K1 = P + I = 31 \quad (5)$$

$$K2 = -P = -30.38 \quad (6)$$

where P is the P component and I the I component of PI controller 24. In other words, P=30.38 (corresponding to 98%) and I=0.62 (corresponding to 2%).

Figure 16:
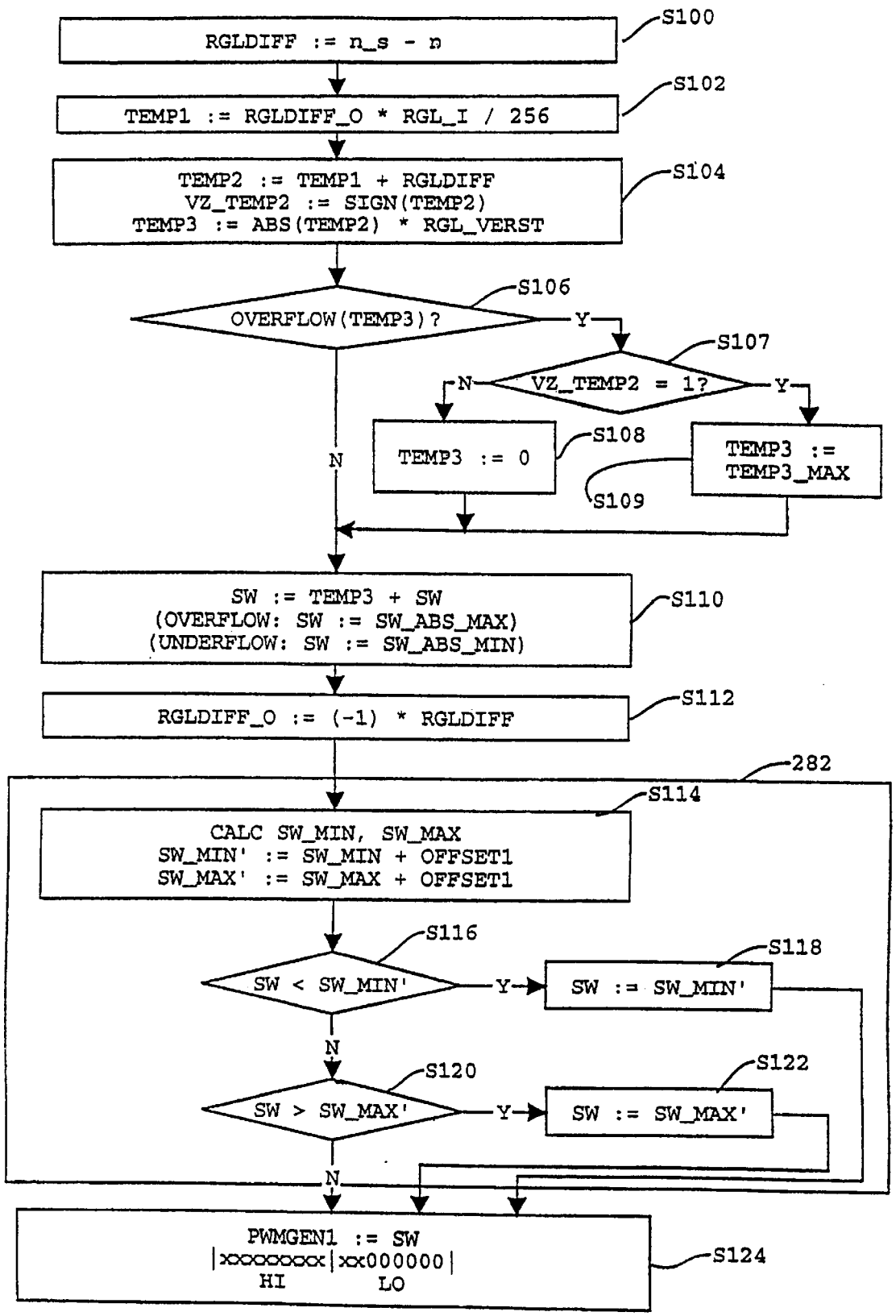
FIG. 16 shows a flow chart for carrying out the control arrangement shown in FIG. 15.

FIG. 16 shows a flow chart of an embodiment of controller 24 from FIG. 15.

In S100, a system deviation RGLDIFF is created from the difference between setpoint n_s and actual value n.

In S102, an old system deviation RGLDIFF_O is weighted. Weighting is performed by multiplying by a value RGL_I (e.g. 0x F9=249) and then dividing by 256 (0x0100). RGLDIFF_O had already been multiplied by −1 earlier in the control pass (S112). The result is stored in a variable TEMP1.

In S104, the present system deviation RGLDIFF and the weighted old system deviation TEMP1 are added, and stored in a value TEMP2. The sign of TEMP2 is saved in a value VZ_TEMP2. The absolute value of TEMP2 is multiplied by a value RGL_VERST, and stored in TEMP3. Multiplication causes an amplification of both the P and the I component. If this multiplication causes an overflow, execution branches from S106 to S107.

In S107, VZ_TEMP2 is checked. If VZ TEMP2=1, then in S109 TEMP3 is set to a maximum value TEMP3_MAX (e.g. all bytes 0x FF). Otherwise TEMP3 is set to 0 in S108.

In S110, a new control output SW (value at point 280 in FIG. 15) is created by adding TEMP3 and an old control output SW. If an overflow occurs in this context, the control output SW is set to SW_ABS_MAX (e.g. all bytes 0xFF); in the event of an underflow, the value SW is set to SW_ABS_MIN (e.g. all bytes 0x00).

In S112, the present system deviation RGLDIFF is saved in RGLDIFF_O for the next pass of controller 24. In this context, the sign of RGLDIFF is simultaneously changed.

After S112, a control output limitation is performed in a controller segment 282 (steps 114 to S122).

In S114, a minimum control output SW_MIN and a maximum control output SW_MAX are calculated (CALC). These extreme control outputs are discussed in more detail in FIGS. 20, 22, and 28. An offset OFFSET1, deriving from the fact that the triangular signal of triangular generator 183 (FIG. 9) has an offset 199 from the 0 V voltage (FIG. 10A), is added to the maximum control outputs. This offset is already contained in the control output SW, but not in the calculated extreme control outputs SW_MIN and SW_MAX. In the variant shown in FIG. 30 (which is discussed separately), this offset is omitted.

S116 checks whether the control output SW is less than SW_MIN'. If so, in S118 SW is set to SW_MIN'.

S120 checks whether SW is greater than SW_MAX'. If so, in S122 SW is set to SW_MAX'.

The values SW_MIN' and SW_MAX' are calculated in accordance with S114.

In S124, the limited control output SW is transferred to PWM generator 25 (PWMGEN1). PWM generator 25 has a resolution of 10 bits. Thus, for example, the eight bits of the high byte of SW and the two most significant bits of the low byte (shown as "x") are transferred. The remaining bits (shown as "0") are not used.

This controller 24 has a very high accuracy, e.g. a deviation of +/−1 rpm at a rotation speed of 10,000 rpm.

Controller 24 must be adapted to each type of motor by modifying the gain factors RGL_I (S102) and RGL_VERST (S104), and the magnitude of the variables must be selected accordingly. A check for overflows and underflows must be made for each of the respective calculation operations.

Software-Based Current Limiting

Figure 17:
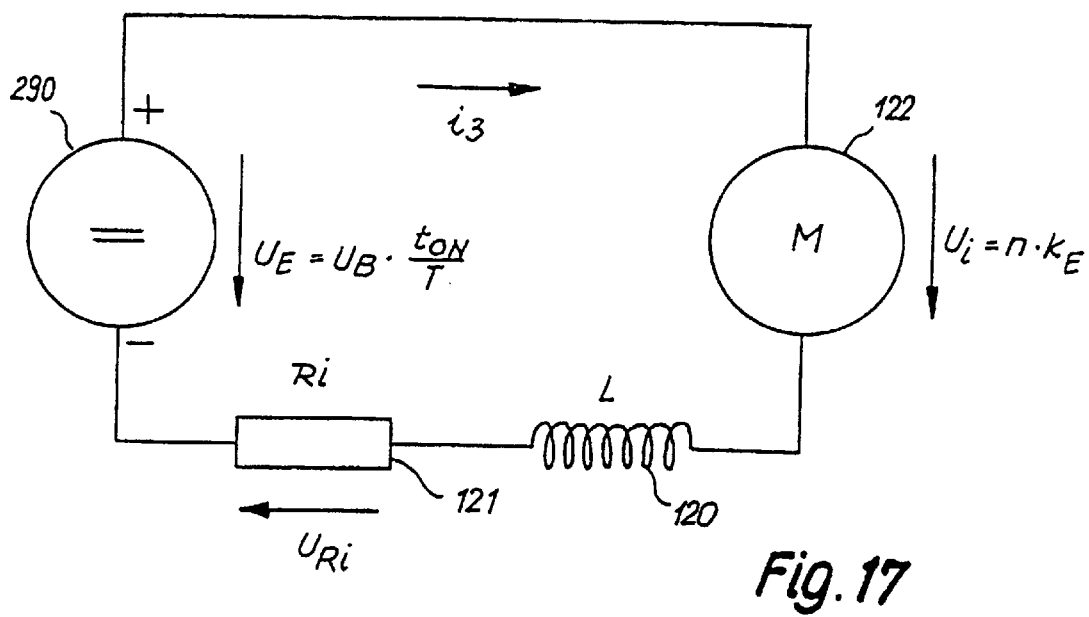
FIG. 17 is a greatly simplified arrangement to explain the flow chart of FIG. 16.
Figure 18:
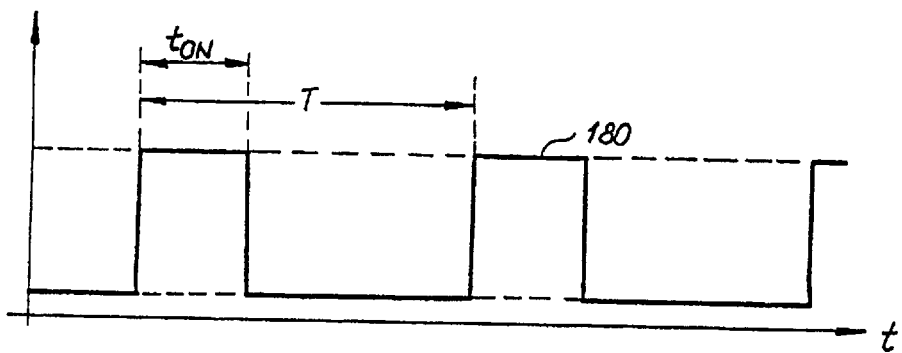
FIG. 18 is a depiction of a PWM signal and the signal shapes and times occurring in the context thereof.

FIG. 17 shows an additionally simplified equivalent circuit diagram of FIG. 3, and FIG. 18 shows an example of a PWM signal PWM2 that is labeled with the reference character 180. Identical parts are labeled with the same reference characters as in previous Figures.

Supply voltage $U_B$ is reduced by signal PWM2 180 (FIG. 8) in proportion to its pulse duty factor $t_{ON}/t$ (FIG. 18). The resulting reduced voltage is referred to as $U_E$. The relevant equation is approximately:

$$U_E = U_B * PWM2 = U_B * t_{ON}/t \qquad (7)$$

The voltage $U_i$ induced in a stator winding 116 (FIG. 3) by the rotation of permanent-magnet rotor 110 is represented by a voltage source M labeled 122. If, according to equation (7), the equivalent voltage $U_E$ is greater than this induced voltage $U_i$, a positive winding current $i_3$ then occurs. The product of $U_i$ and $i_3$ is also positive, i.e. motor 32 consumes energy and is driven.

If, however, the induced voltage $U_i$ becomes greater than the equivalent voltage $U_E$, the result is a negative winding current $i_3$ and motor 32 brakes, since it is now operating as a generator. The direction of the current $i_3$ depicted in FIG. 17 reverses.

The induced voltage $U_i$ is often also referred to as the "counter-EMF" of such a motor. Its magnitude is determined using equation (2).

In FIG. 17 as in FIG. 3, the winding resistance $R_i$ is labeled 121 and the winding inductance L is labeled 120.

Figures 19, 20:
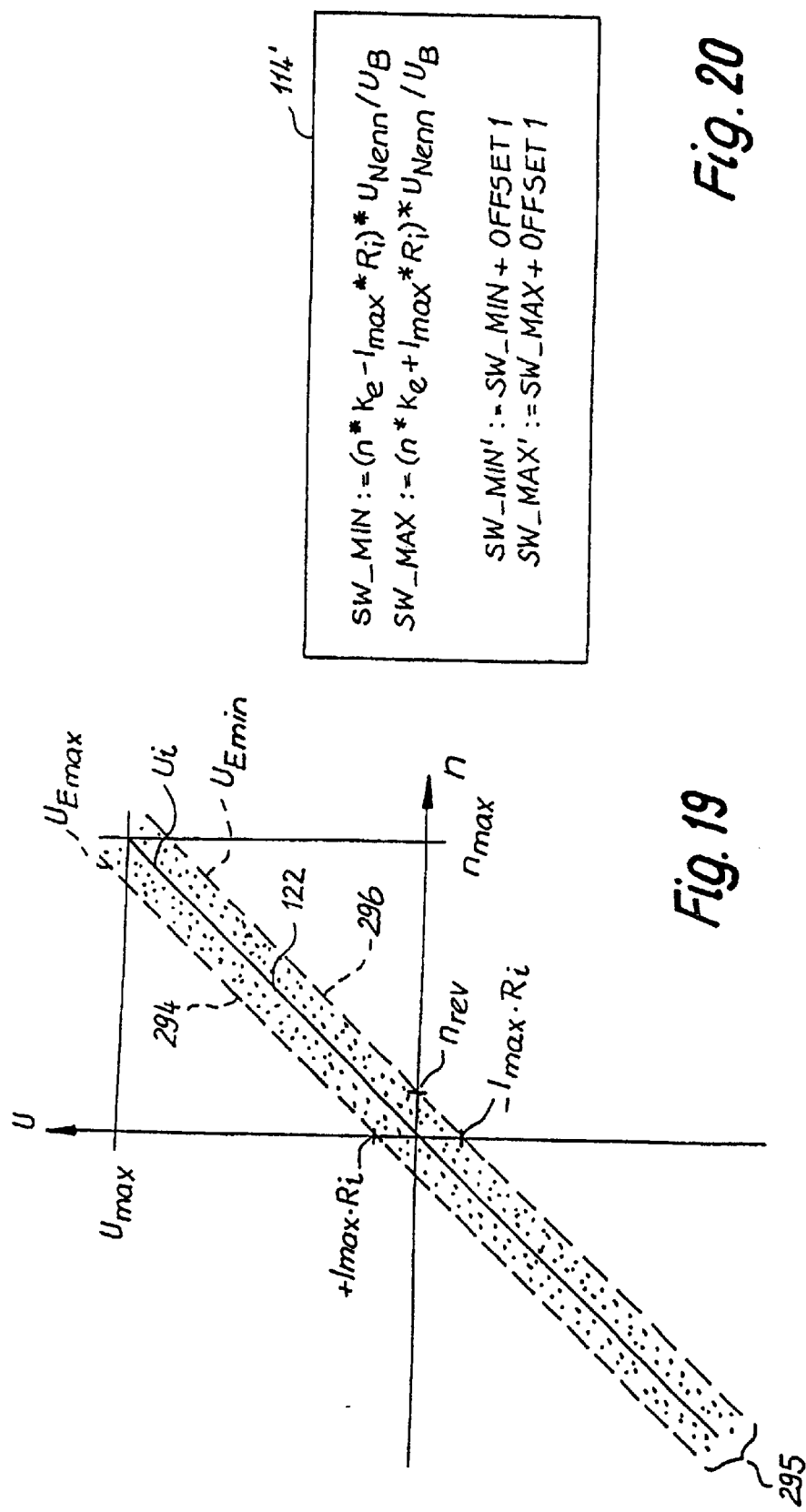
FIG. 19 shows a motor diagram to explain the electronically commutated motor depicted in the foregoing Figures.
FIG. 20 shows one step of a flow chart that can be used as a variant in the control arrangement of FIG. 16.

FIG. 19 is a diagram in which the induced voltage $U_i$ (FIG. 3) is plotted against rotation speed n as curve 122. As defined in equation (2), $U_i = n * k_e$.

Also plotted are two dashed-line curves 294, 296 which indicate the maximum and minimum permitted equivalent voltage $U_{E,max}$ and $U_{E,min}$, respectively. These equivalent voltages are obtained, in accordance with equation (7), from the pulse duty factor PWM2 and the voltage $U_B$. $n_{rev}$ is the reversal rotation speed above which, in the presence of positive current limiting, a reversal (i.e. a commutation for the opposite rotation direction) is possible.

The manner in which the limiting curves 294 and 296 come into being, and their significance, are explained below.

Winding current $i_3$ through output stage 78 (FIG. 3) can be calculated (see FIG. 17) from the voltage $U_{Ri}$ at resistor 121 and the value $R_i$ of resistor 121, using the following equation (8):

$$i_3 = U_{Ri}/R_i \qquad (8)$$

After extended energization, inductance L no longer has any influence, and the voltage $U_{Ri}$ at resistor 121 can be calculated as $$U_{Ri} = U_E - U_i = U_B * t_{ON}/T - n*ke = i_3 * R_i \qquad (9)$$

Thus, for the winding current $i_3$:

$$i_3 = (U_B * t_{ON}/T - n*ke)/R_i \qquad (10)$$

The equation for the equivalent voltage $U_E$ is $$U_E = n*k_e + i_3*R_i \qquad (11)$$

The current $i_3$ through a stator winding 116 of motor 32 is a critical magnitude in terms of current flow through output stage 78, i.e. in terms of controlling the transistors of that output stage. If $i_3$ becomes too high, a great deal of heat is created in the stator winding, and in the worst case the permanent magnets of rotor 110 (FIG. 1) can be demagnetized by the resulting high magnetic field of stator 114, so that motor 32 can no longer function. This condition must therefore be prevented.

The maximum current $I_{max}$ in the stator winding in motor mode is usually indicated in the data sheet, and in braking mode this permitted current is usually $-I_{max}$.

We therefore obtain, for the maximum equivalent voltage $U_{Emax}$:

$$U_{Emax} = n*k_e + I_{max}*R_i \qquad (12)$$

The equation for the minimum equivalent voltage $U_{Emin}$ is similar:

$$U_{Emin} = n*k_e - I_{max}*R_i \qquad (13)$$

For example, if motor 32 is being operated at a rotation speed of 0 rpm at a voltage $U_E$ that is between $-I_{max}*R_i$ and $+I_{max}*R_i$, then the current $i_3$ is less than $I_{max}$.

Thus if the equivalent voltage $U_E$ being conveyed to motor 32 is located in a range 295 (FIG. 19) between curves 296 and 294, motor 32 is therefore operating in a safe working range, i.e. rotor 110 will not be demagnetized, and the stator winding of the motor will not be excessively heated.

The size of safe working range 295, i.e. the distance between $U_{Emin}$ and $U_{Emax}$, depends greatly on the value $R_i$ of winding resistance 121. If this value is large, motor 32 has a large safe working range 295. A motor of this kind can be called an "impedance-protected" motor. In contrast to this, the motor according to FIG. 19 is not an impedance-protected motor, since safe working range 295 is very narrow, and care must therefore be taken to ensure that the motor always operates in that safe working range 295.

With the controller represented by FIG. 16, it is possible according to the present invention to effect, with the aid of control output limiter 282, a safe software-based current limiting function which keeps motor 32 in the aforesaid safe range 295.

For that purpose, in S114 (FIG. 16) the values SW_MAX and SW_MIN are calculated as a function of the instantaneous rotation speed n, as follows:

$$SW\_MAX := U_{Emax}(n) \qquad (14)$$

$$SW\_MIN := U_{Emin}(n) \qquad (15)$$

These functions defined by equations (14) and (15) can have very different structures depending on the precision required. The exemplary embodiments given below are simplified ones in which approximate values for SW_MIN and SW_MAX are calculated. The exact values for SW_MAX and SW_MIN are defined by means of an analog current limiting system using the arrangements of FIGS. 5 through 7, in which context the current $i_2$ is actually measured.

The arrangement shown in FIG. 19 can, however, be implemented even without measuring current $i_2$, since according to equations (12) and (13), curves 294 and 296 are a function only of the rotation speed n of motor 32 (and not of the current $i_2$); and since μC 23 "knows" the rotation speed n from Hall signals HS1, HS2, HS3, etc. (cf. equation (4)), μc 23 can calculate the permitted value $U_{Emax}$ and $U_{Emin}$ for each motor rotation speed n. This type of approach is depicted in FIG. 30.

If the permitted value $U_{Emax}$ is exceeded, this means that the pulse duty factor PWM at output 157 of μC 23 (FIG. 30) is too high, and said pulse duty factor is then reduced by the controller's software. If the value becomes less than the permitted $U_{Emin}$, the pulse duty factor PWM at output 157

(FIG. 30) is correspondingly increased by µC 23, since it is too low. As a result, the current $i_2$ in motor 32 is limited in such a way that motor 32 always runs within the limits defined by range 295 in FIG. 19.

Figure 10:
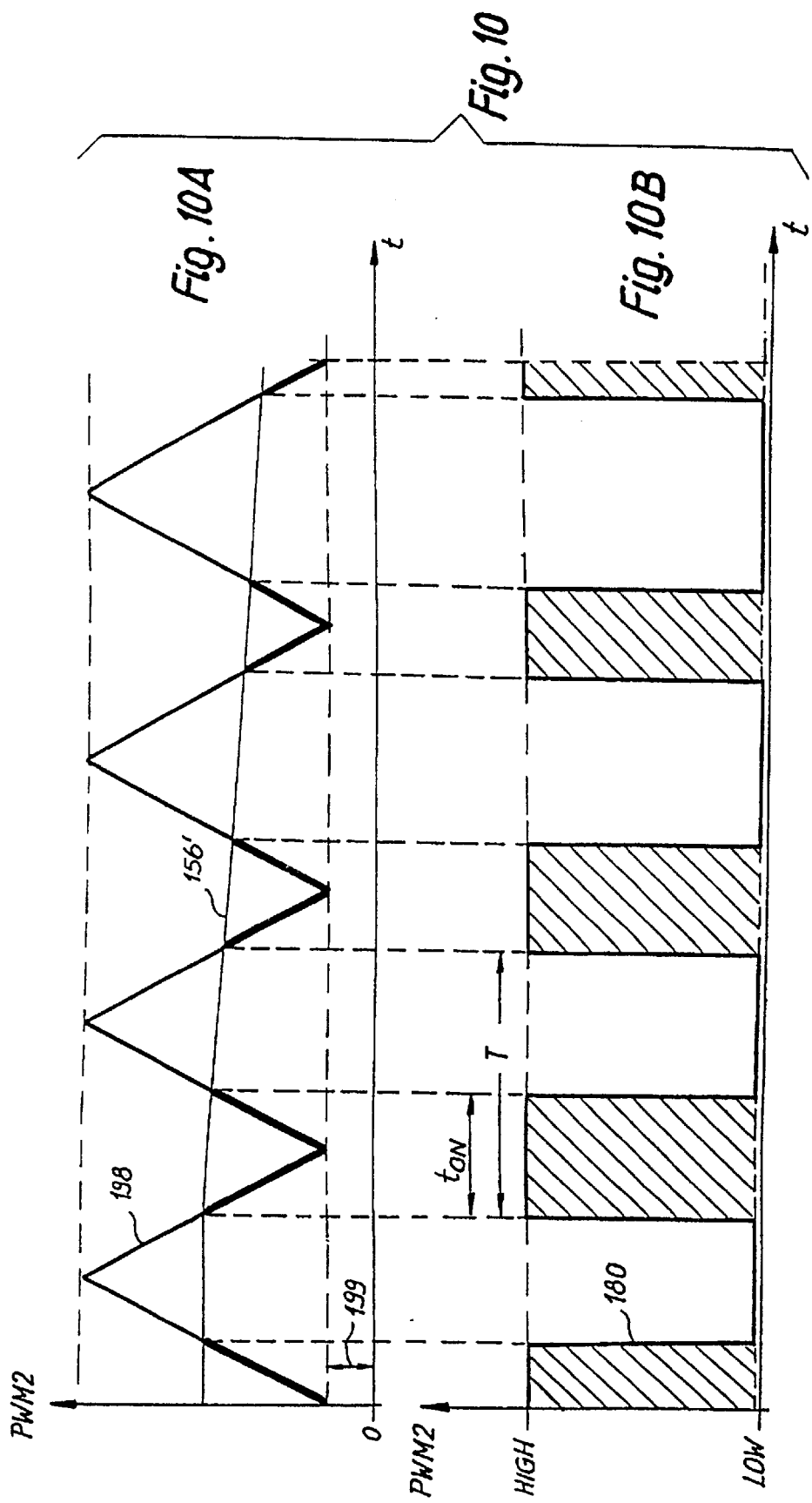
FIGS. 10A and 10B show diagrams to explain FIG. 9.
Figure 30:
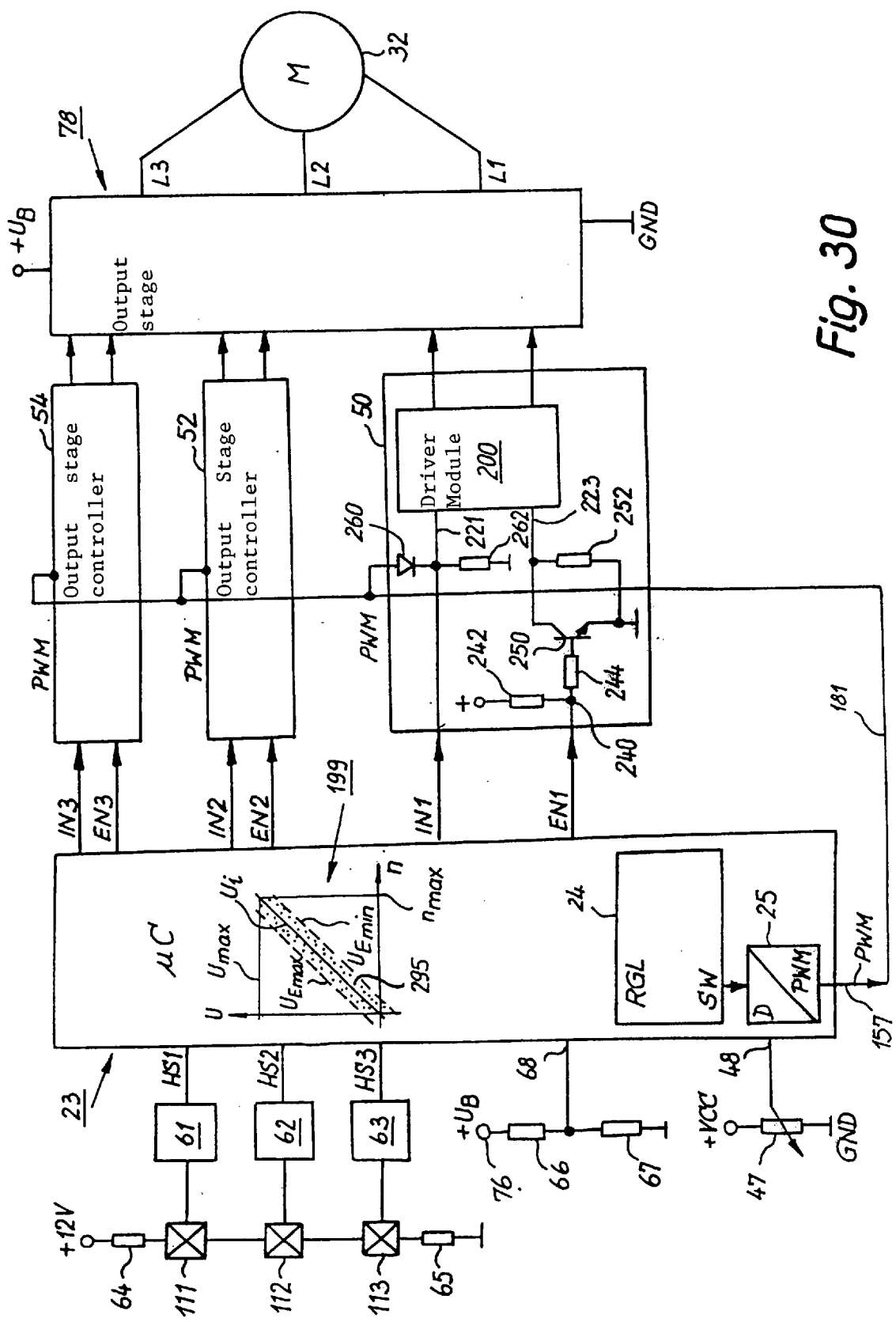
FIG. 30 shows a preferred variant of the arrangement of FIG. 1, which operates with a synthetic motor model.

The great advantage is that in this case the analog current limiters as shown in FIGS. 8 through 10 can be omitted: in other words, µC 23 contains, so to speak, a synthetic model of motor 32 (with motor constants ke, permitted currents Imax (drive) and −Imax (braking), and winding resistance Ri); and on the basis of these values and the (continuously measured) rotation speed n, µC 23 calculates a control output for motor 32, e.g. the pulse duty factor PWM in FIG. 30. This control output can then be used directly to control motor 32, and is conveyed directly, as the pulse duty factor, to input 180 of FIG. 11. The analog current limiting arrangements shown in FIGS. 8 through 10 are thus absent in FIG. 30.

This kind of synthetic model of motor 32 can then also take into account further variables, for example the heat capacity of motor 32; in other words, it is even possible to go beyond range 295 in FIG. 19 for a short time as long as there is no danger that rotor 110 will be demagnetized. This makes possible faster startup of motor 32, for example.

Motor constant $k_e$, the maximum permitted current $I_{max}$ in drive mode and maximum permitted current $-I_{max}$ in braking mode, as well as the value $R_i$ of winding resistance 121, either can be stored in the program of µC 23 as constant values or can be entered from outside into the controller, for example by modifying corresponding values in an EEPROM (which is not depicted). The reader is referred, in this context, to German patent application 198 26 458.5 of Jun. 13, 1998.

Motor constant $k_e$, the maximum permitted current $I_{max}$ in drive mode and maximum permitted current $-I_{max}$ in braking mode, as well as the value $R_i$ of winding resistance 121, either can be stored in the program of µC 23 as constant values or can be entered from outside into the controller, for example by modifying corresponding values in an EEPROM (which is not depicted). The reader is referred, in this context, to German patent application 198 26 458.5 of Jun. 13, 1998, corresponding to PCT/EP99/03992, whose US phase is U.S. Ser. No. 09/719440, filed Dec. 12, 2000.

Supportive Software-Based Current Limiting

Figure 21:
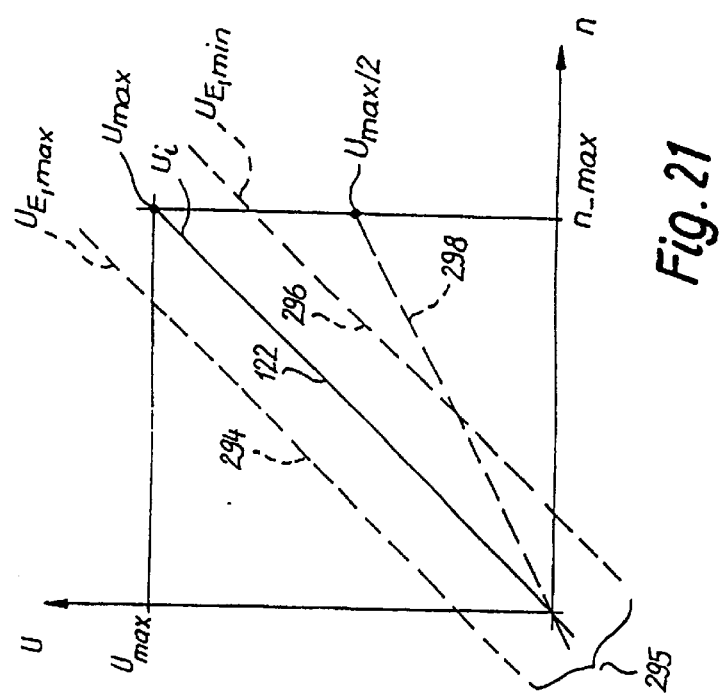
FIG. 21 shows a motor diagram to explain a simplified current limiter.

FIG. 21 is a diagram like that in FIG. 19, in which the induced voltage $U_i$ 122 is plotted against rotation speed n. Lines $U_{E,min}$ 296 and $U_{E,max}$ 294 correspond to those in FIG. 19, and therefore delimit range 295 around $U_i$ in which motor 32 can operate safely.

The two rotation directions of motor 32 require only one diagram with the absolute value of the rotation speed n, since, for example in the case of three-phase motors, the only difference between one rotation direction and the other is the different type of commutation. The calculation of rotation speed n from the Hall time t_HALL (FIG. 12) is independent of rotation direction.

The calculation of SW_MIN and SW_MAX in FIG. 20 contains multiplications and optionally also divisions, which require a great deal of calculation effort and therefore also time expenditure in the µC 23 that is used.

To reduce the calculation effort in control output limiter 282 in FIG. 16, it is possible, for example, firstly to limit the control output only downward, and secondly to use a simpler calculation.

FIG. 21 contains a straight line 298 that passes through the zero point of the coordinate system. At the maximum no-load rotation speed n_max, straight line 298 reaches, for example, half the maximum induced voltage $U_{max}/2$. This straight line represents a limitation of the control output SW_MIN which is effective when motor 32 is braking, i.e. is operating as a generator; in other words, in braking mode the control output cannot drop below this value, thereby limiting the braking current.

FIG. 22 shows the flow chart of a control output limiter 282' that, in contrast to control output limiter 282 of FIG. 16, limits the control output SW only downward (in the direction toward SW_MIN'). Steps S120 and S122 of FIG. 16 are thus omitted.

Calculation of the minimum control output SW_MIN in S114" is performed, based on straight line 298 of FIG. 21, using the formula $$SW\_MIN := (\tfrac{1}{2} * n/n\_max) U_{Nenn}/U_B \qquad (16)$$

where $U_{Nenn}$ is the rated voltage of the motor, and n_max the maximum no-load rotation speed at rated voltage $U_{Nenn}$.

The result is a simple downward current limiting function which supports a hardware current limiter such as that of FIG. 7.

A combination of hardware and software current limiting has a further advantage. With the software current limiter, the maximum braking current $i_2'$ can be set in such a way that it is slightly higher than the maximum permitted current. The hardware current limiter recognizes this excessive current $i_2'$ and then limits it further. This makes it possible to ensure that motor 32 achieves its maximum output, and at the same time to account for tolerances of motor 32. Very fast control operations are also achieved in this manner.

As explained in FIG. 6, for negative current limiting a minimum pulse duty factor SW_MIN_CONST must be maintained in order to allow measurement of the braking current $i_2'$. Since a rotation speed-dependent minimum control output SW_MIN (n) is observed in FIGS. 21 and 22 (cf. straight line 298), the constant minimum control output SW_MIN_CONST. mentioned in FIG. 6 is eliminated. This expands the control range of motor 32.

A further possibility for simplifying the calculation of SW_MIN and SW_MAX consists in storing the control outputs SW_MIN and SW_MAX as a function of the rotation speed n in a table, and interpolating as necessary between the tabulated values.

Yet another possibility for simplifying the calculation of SW_MIN and SW_MAX consists in regarding the value $U_{Nenn}/U_B$ as a constant factor, for example the value 1. This simplification is possible if there are no large deviations between $U_B$ and $U_{Nenn}$. This eliminates a division and thus saves calculation time.

Further calculation time is saved by the fact that multiplications are replaced by shifting operations. The result of each shifting of a variable one place to the left is to multiply by two; a shift one place to the right results in a division by two.

Monitoring the Operating Voltage

Figure 23:
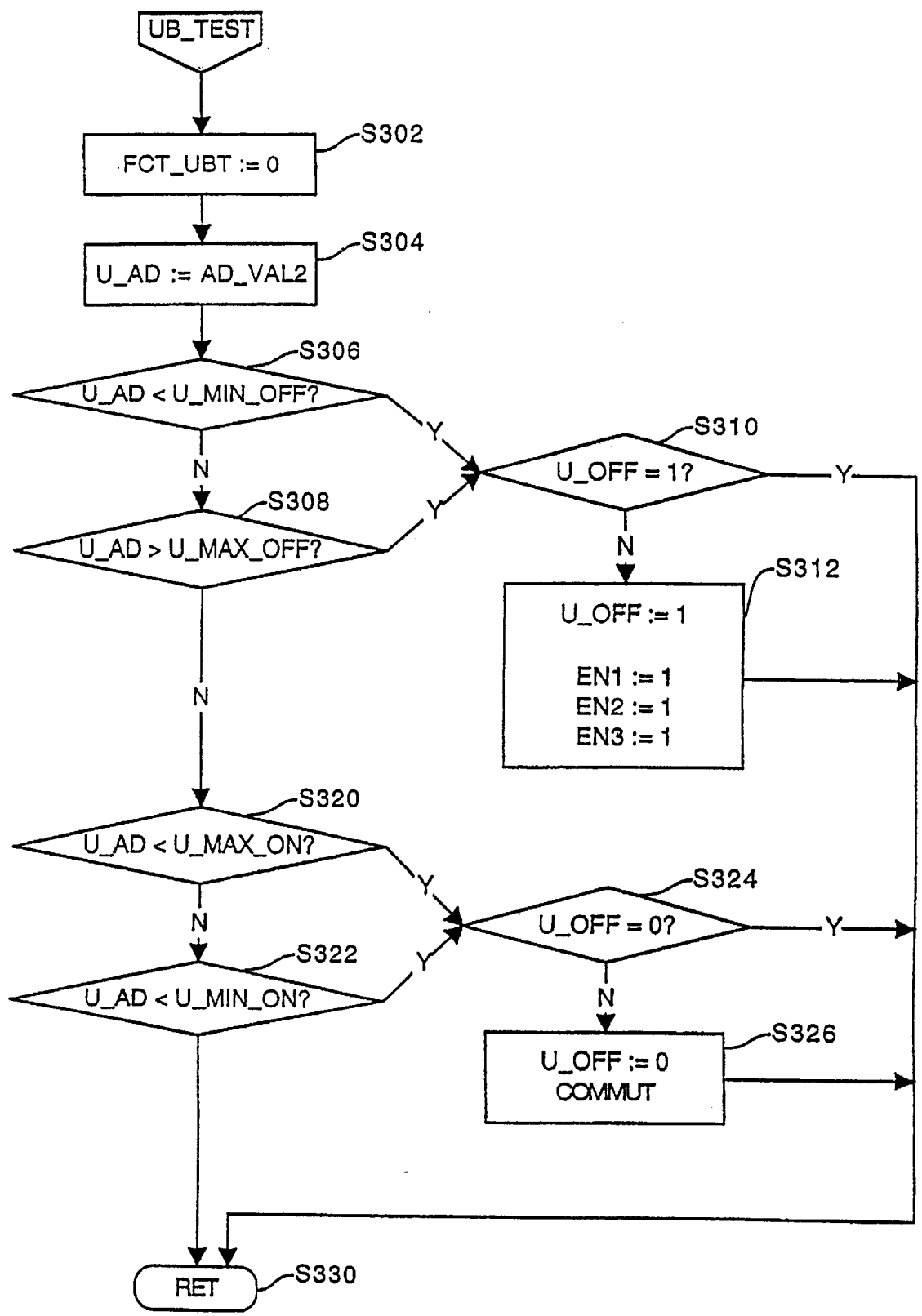
FIG. 23 shows a flow chart to explain the limiting of the motor's operating voltage $U_B$ that is conveyed to it via a direct-current link circuit.

FIG. 23 shows a UB_TEST subprogram which serves to monitor the operating voltage $U_B$ that can be measured at terminal 76 in FIG. 1. If $U_B$ lies outside a permitted range, full bridge circuit 78 is correspondingly influenced so that the components connected to link circuit 73, 74—for example power transistors 80 through 85, free-wheeling diodes 90 through 95, capacitor 75, and components 77 (FIG. 1)—are not damaged.

The UB_TEST subprogram is called by function manager 603 (FIG. 25) when a variable FCT_UBT is set to 1.

The request for the UB_TEST subprogram occurs in the TIMER0_ROUT interrupt routine in S201 (FIG. 13).

In S302, the variable FCT_UBT is set back to zero.

In S304, an A/D converter (in µC 23) queries the value of the voltage at input 68 of µC 23, and the result is stored in the variable U_AD as a digital value.

Figure 24:
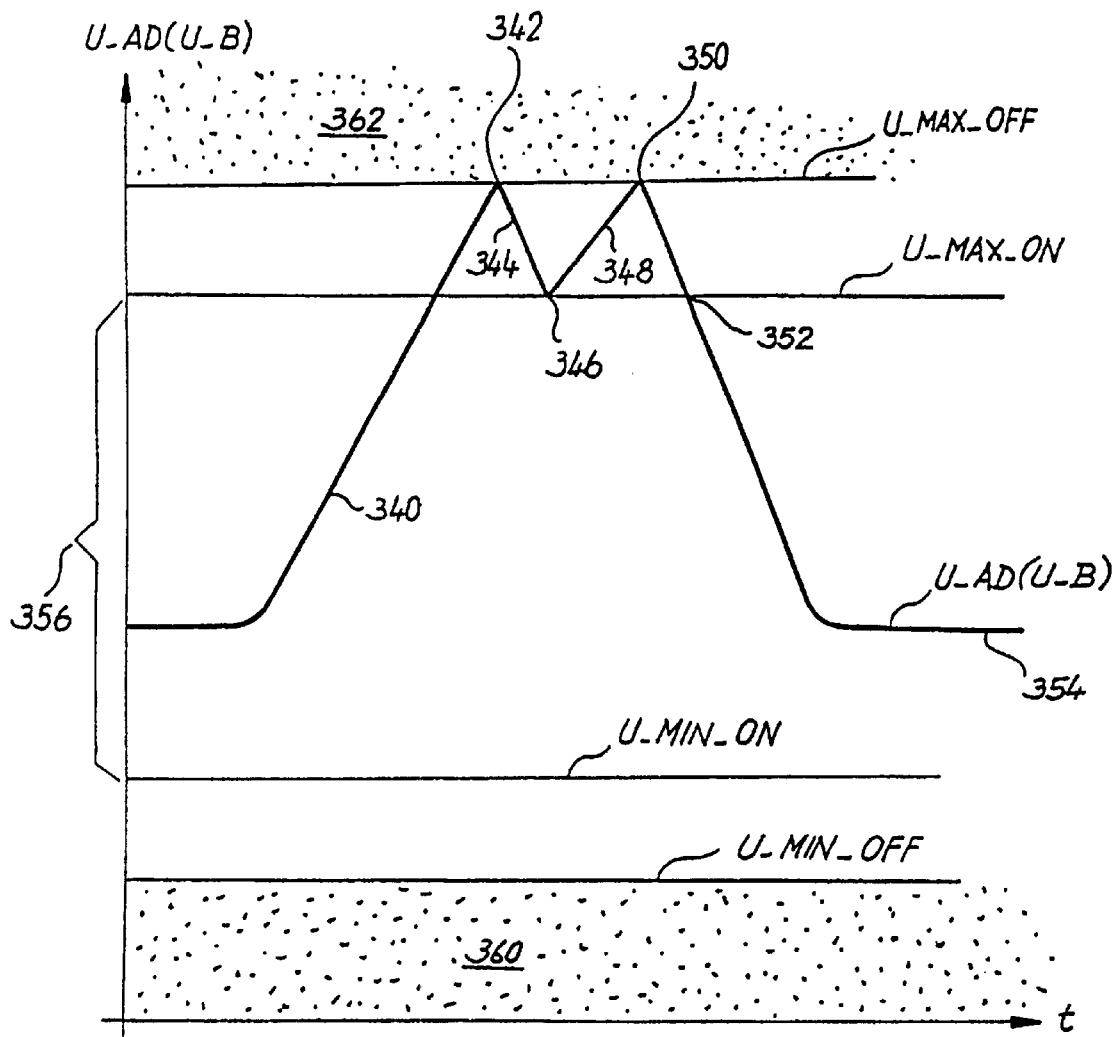
FIG. 24 is a schematic depiction to explain the flow chart of FIG. 23.

FIG. 24 shows an example of the change over time in the digital magnitude U_AD, which corresponds to the analog magnitude $U_B$ (=operating voltage of motor 32). The value U_AD can become too low because, for example in the case of an electric vehicle, the battery is discharged. The operating voltage then drops below a lower limit value U_MIN_OFF, and motor 32 must be automatically switched off. When that voltage then rises above a higher lower limit value U_MIN_ON, motor 32 can be switched back on. The result is to create a lower switching hysteresis.

During braking, the magnitude U AD can become too great because motor 32, in generator mode, is feeding energy back into capacitor 75, so that the voltage $U_B$ at that point rises because that energy cannot be consumed by loads 77. An excessive rise in the voltage $U_B$ must be prevented, since otherwise components 77 can be damaged.

In FIG. 24, a rise in the magnitude U_AD caused by a braking operation of motor 32 is depicted at 340. At 342, an upper threshold value U_MAX_OFF is exceeded, and all the transistors 80 through 85 of motor 32 are blocked. This causes the value U_AD to decrease (at 344), and to reach (at 346) a lower threshold value U_MAX_ON at which the commutation of transistors 80 through 85 is once again switched on normally, so that (at 348) the value U_AD rises again. At 350, transistors 80 through 85 are once again blocked so that at 352 the value U_AD again decreases; at 352 the value once again reaches the threshold U_MAX_ON where commutation of motor 32 is again switched on. Since, in this example, the braking operation is now at an end because the motor has reached its rotation speed setpoint n_s, the value U_AD decreases further until reaching the "normal" value 354 of U_AD which lies in the "safe range" 356.

In FIG. 24, 360 designates a "forbidden range" with an excessively low operating voltage $U_B$, and 362 indicates a forbidden range with an excessively high operating voltage $U_B$ that might otherwise occur during braking.

The program shown in FIG. 23 is used to implement the sequences just described. Steps S306 through S308 check whether the magnitude U_AD lies outside the permitted range between U_MIN_OFF and U_MAX_OFF. If so, execution branches to S310; if not, to S320.

S310 checks, on the basis of the variable U_OFF, whether output stage 78 is already switched off. If so (i.e. if U_OFF=1), execution can immediately branch to the end at S330. Otherwise, in S312 U_OFF is set to 1, and all the signals EN1, EN2, EN3 (FIG. 8) are set to HIGH so that all the bridge transistors 80 through 85 (FIG. 1) are made nonconductive. Since voltage 78 induced in windings 115, 116, 117 when power switches 80 through 85 are open is less than voltage $U_B$ at capacitor 75, all the free-wheeling diodes 90 through 95 are blocked, and no current (and thus no power) can flow out of motor 32 into link circuit 73, 74. Motor 32 is thus "disconnected," i.e. it is neither consuming nor delivering power.

In S320 through S322, the program checks whether U_AD lies within permitted range 356. This permitted range 356, which is smaller than the non-permitted range defined by steps S306 and S308, results in a hysteresis of the current limiting function which improves operation of the motor. If no hysteresis is necessary, S324 is appended directly to the "N" alternative of S308, and steps S320, S322 can be omitted.

If U_AD does lie within permitted range 356, execution branches from S320 or S322 to S324; otherwise the subprogram UB_TEST terminates at S330.

S324 checks whether U_OFF was already 0, i.e. whether output stage 78 was already being commutated normally. If U_OFF was equal to zero, execution then branches to the end (S330); otherwise the variable U_OFF is set to 0 in S326, and at COMMUT, output stage 78 is commutated normally in accordance with the table in FIG. 2, as a function of Hall signals HS1, HS2, HS3. It is also possible in this context to "advance" the onset of commutation as rotation speed increases; cf. in this connection, for example, DE 197 00 479 A1.

In this fashion, upon braking of motor 32 (i.e. when it exceeds the desired rotation speed n_s defined by the rotation speed controller), it can feed energy in generator mode back into capacitor 75 (FIG. 1) while the voltage $U_B$ at that capacitor is prevented from assuming impermissible values.

This also ensures that motor 32 is switched off if its operating voltage $U_B$ drops below a permitted value U_MIN_OFF, thus preventing improper operation of motor 32. This is particularly important when a motor of this kind is being operated from a battery (not depicted), which must be imagined at the location of rectifier 72 in FIG. 1, in a manner familiar to those skilled in the art.

In the COMMUT subprogram (FIG. 29), output stage 78 is commutated as a function of Hall signals HS1, HS2, HS3 if no further faults are present. The COMMUT subprogram, which also serves in general for commutation, takes into account the value of U_OFF when commutating. If U_OFF has a value of 1, all the signals EN1, EN2, EN3 (FIG. 8) remain HIGH (cf. S330 in FIG. 29).

Function Manager

FIG. 25 is a flow chart with one possible embodiment of the main program executing in µC 23, in the form of a so-called function manager.

The main program's tasks are to react to events such as, for example, a change in one of the rotor position signals HS1, HS2, or HS3; also to make resources, especially calculation time, available to each function as necessary, and to observe priorities when assigning resources.

After motor 32 is switched on, an internal reset is initiated in µC 23. Initialization of µC 23 takes place in S600. Further time-critical sequences may then follow, as indicated in S601.

Execution then branches into function manager 603 which begins in S602. Function manager 603 regulates execution of the individual subprograms, and determines their priorities.

Figure 26:
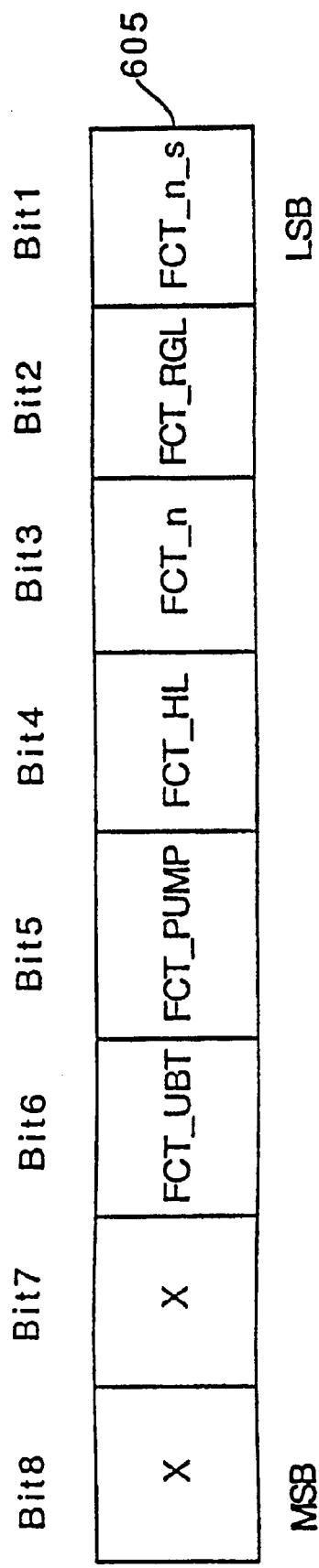
FIG. 26 is a depiction of a control word having eight bits whose purpose is to define, in a function manager (FIG. 25), priorities for the execution of operations in the motor according to the present invention.

FIG. 26 shows an example of a function register 605 in which one bit is reserved for each of subprograms S604, S610, S614, S618, and S622.

In this example, function register 605 is one byte wide; beginning from the least significant bit (LSB), the following request bits are defined for the requestable functions explained below:

Bit1: FCT_n_s for calculating the rotation speed setpoint from an analog voltage value at input 48 of µC 23;

Bit2: FCT_RGL for a control routine of any desired type;

Bit3: FCT_n for calculating the actual rotation speed n;

Bit4: FCT_HL for calculating the Hall time t_HALL (cf. FIG. 12);
Bit5: FCT_PUMP for pumping by μC 23 (cf. FIG. 23);
Bit6: FCT_UBT for monitoring the operating voltage $U_B$.

The remaining bits are reserved for additional requestable functions that may be inserted into function manager 603 as necessary.

If a specific requestable function is to be requested by another function or an interrupt routine, the bit of the function that is to be requested is then set to 1; e.g. FCT_UBT:=1. If function manager 603, during a pass subsequent to this request, finds no other requestable function having a higher priority, then in this instance the function for monitoring the operating voltage, which is depicted in FIG. 23, is executed.

Once a requested function has been executed, its bit in function register 605 is set back to 0; e.g. FCT_UBT:=0 in S302 of FIG. 23.

In FIG. 25, a check is made after S602, in a predetermined sequence starting with the most important requestable function, as to whether its request bit is set. If such is the case for a function, it is executed; the program then branches back to step S601. The sequence in which function register 605 is checked defines the prioritization of the requestable functions. The higher up any such function is located in function manager 603, the higher its priority.

S602 checks whether the request bit FCT_PUMP for pumping is set, i.e. has a value of 1. If it is set, execution branches to S604 and the pumping function (described prior to FIG. 15) is executed. Before termination, the pump function sets its request bit FCT_PUMP back to zero. Execution then branches back to step S601.

If FCT_PUMP in S602 was not set, S608 then checks whether FCT_UBT is set. If so, the function S610 (FIGS. 23, 24) for monitoring the operating voltage $U_B$ is called.

In the same fashion, if FCT_n is set, the function S614 for calculating the actual rotation speed n (FIG. 12) is called from S612. If FCT_RGL is set (S616), the controller function S618 (FIG. 16) is called; and if FCT_n_s is set (S620), the function for calculating the rotation speed setpoint n_s (FIG. 8) is called.

If none of the bits checked in S602 through S620 was set, execution then branches from S620 back to S601, i.e. S601 is executed at each pass.

FIG. 25 also symbolically shows (at 624) a Hall interrupt that has the highest priority L1 (level 1). A Hall interrupt has this high priority because accurate sensing of the Hall signals is very important for quiet operation of motor 32. It interrupts all the processes of function manager 603, as symbolized by an arrow 626.

Depicted below Hall interrupt 624, at 628, is a TIMER∅ interrupt of timer TIMER∅. This has a lower priority (L2), and interrupts all the processes below it, as indicated by arrow 630.

If a Hall interrupt and timer interrupt were to be requested simultaneously, they would be executed in the order of their priority.

The pump function S604 has the next-lower priority L3, since pumping is important for reliable commutation of the motor.

The next-lower priority L4 is possessed by the voltage monitoring function S610, which prevents motor 32 from being damaged by excessive operating voltage.

The function S614 for calculating the actual rotation speed n has the next-lower priority L5. The actual rotation speed n changes more frequently than the rotation speed setpoint n_s.

The controller function S618 has the next-lower priority L6, and the function S622 for calculating the rotation speed setpoint n_s has the lowest priority.

The sequence of steps S602 through S620, and thus their priority, can nevertheless also be interchanged if applicable.

If it is present, function S601—which controls, for example, communication between motor 32 and a desktop computer (not depicted)—has a priority that lies between L2 and L3.

It is possible in this manner to classify the various "needs" of motor 32 in a predefined hierarchy, and to utilize the resources of μC 23 optimally for operation of the motor.

Figure 27:
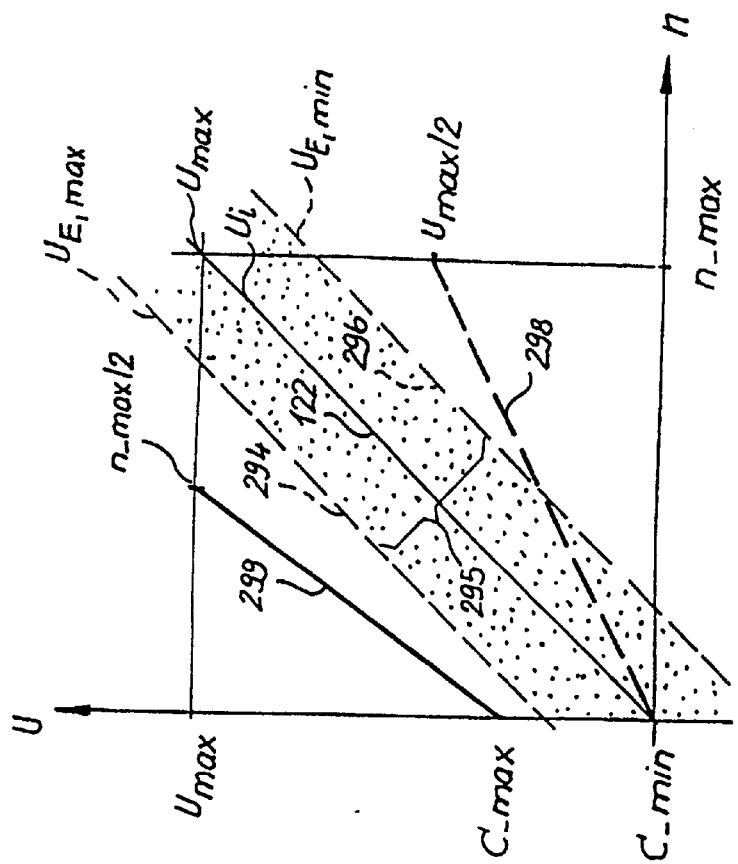
FIG. 27 shows a motor diagram to explain a very advantageous variant of the current limiter.

FIG. 27 shows a diagram similar to that in FIGS. 19 and 21, in which the induced voltage $U_i$ 122 is plotted against rotation speed n. The lines $U_{E,min}$ 296 and $U_{E,max}$ 294 correspond to those of FIG. 19 and thus delimit range 295 around $U_i$ in which safe operation of motor 32 is possible.

The calculation of SW_MIN and SW_MAX in FIG. 20 contains multiplications and optionally also divisions, which require a great deal of calculation effort and therefore also time expenditure in the μC 23 that is used.

To reduce the calculation effort in control output limiter S113 in FIG. 16, a simpler calculation is used. Upper delimiting line 299 and lower delimiting line 298 are depicted as straight lines that have respective offsets c_min and c_max at point n=0 rpm. In this example, c_min=0.

As in FIG. 21, at the maximum no-load rotation speed n_max straight line 298 reaches, for example, half the maximum induced voltage $U_{max}/2$. This straight line 298 represents a limitation of control output SW_MIN. Straight line 299, for example, reaches the maximum voltage $U_{max}$ at half the maximum rotation speed $n_{max}/2$. This constitutes a limitation of the control output SW_MAX.

Figure 28:
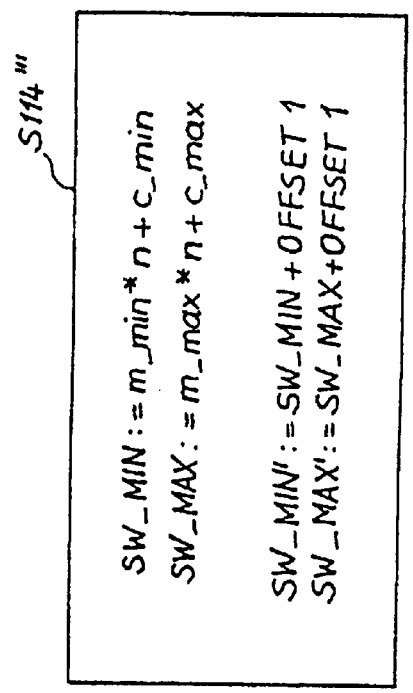
FIG. 28 shows one step of a flow chart that can be used as a variant in the control arrangement of FIG. 16 and serves to implement the variant shown in FIG. 27.

FIG. 28 shows one possible embodiment S114''' of step S114 of the controller of FIG. 16 for the straight lines of FIG. 27. A general straight-line equation is selected:

$$SW\_MIN:=m\_min*n+c\_min$$
$$SW\_MAX:=m\_max*n+c\_max$$

where m_min is the slope of straight line 298, and m_max the slope of straight line 299; c_min is the ordinate intercept of straight line 298 (in this example, c_min=0), and c_max is the ordinate intercept of straight line 299.

By selecting any values for the constants c_max, c_min, m_max, m_min, it is easy to change the behavior of the motor, for example by modifying stored values.

A negative value for c_min can also be selected. A low value for c_max can be selected in order to allow motor 32 to start up more slowly and thus prevent any overshoot upon reaching the rotation speed setpoint n_s. Similarly, for example, straight line 299 can be placed in the region between straight line 294 and straight line 122 in order to achieve very reliable current limiting.

Figure 29:
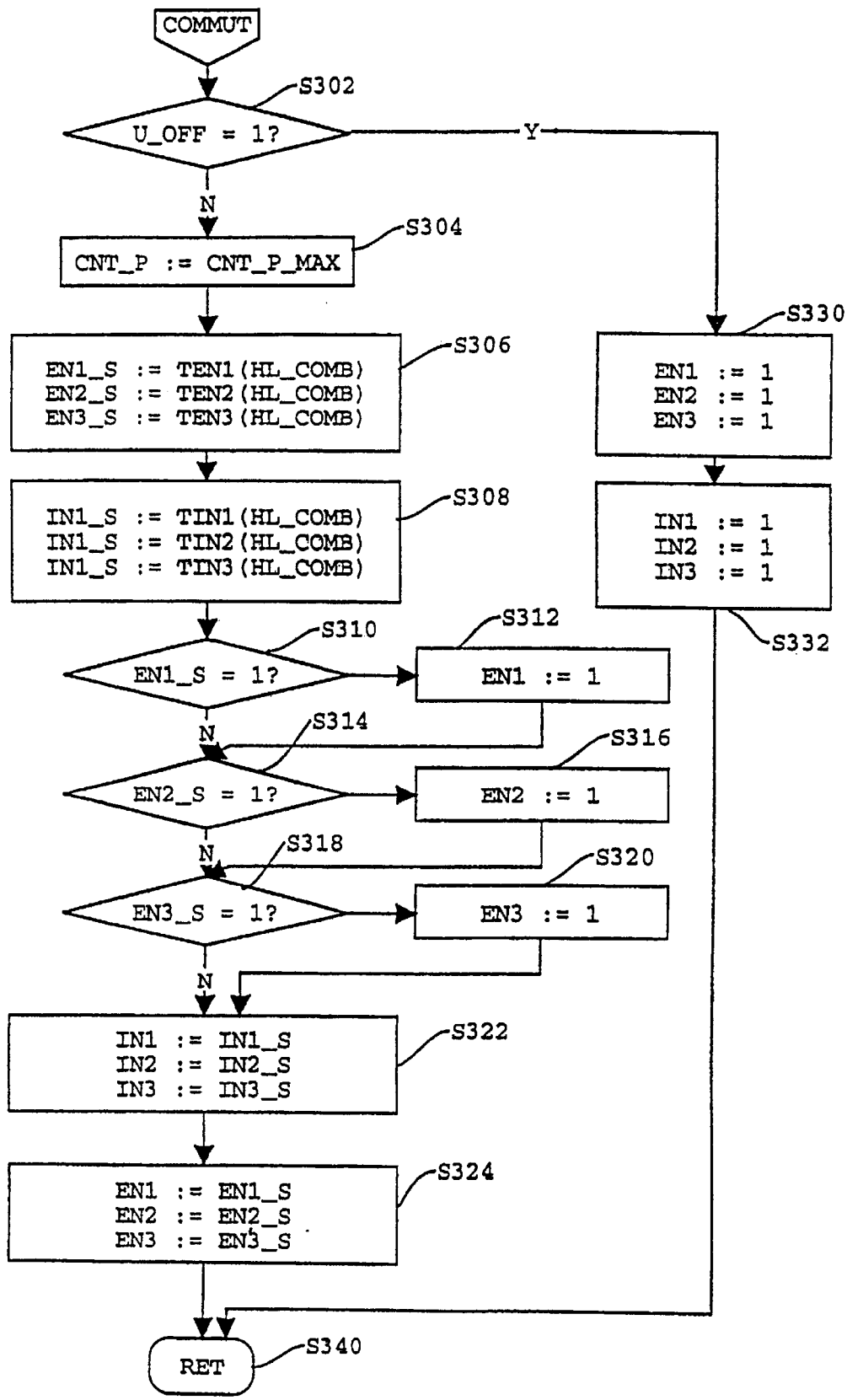
FIG. 29 shows a flow chart for a commutation function that serves to commutate output stage 78.

FIG. 29 shows the COMMUT subprogram which performs commutation of output stage 78 (FIG. 1) in accordance with the commutation table of FIG. 2, using control circuits 50, 52, 54 (FIG. 8). In a motor with no ignition angle shift, this subprogram is called, for example, by the Hall interrupt routine.

S302 checks whether the output stage has been switched off (U_OFF–1) on the basis of the voltage monitoring function UB_TEST (FIG. 23). This means that the voltage at link circuit 73, 74 is too high or too low.

If so, execution branches to S330. In S330, all the driver modules 200 are deactivated. This is done by setting outputs EN1, EN2, EN3 to 1.

In S332, signals IN1, IN2, IN3 are set to 1. This has no effect when driver modules 200 are deactivated, but the status of signals IN1, IN2, IN3, which remains stored, is thereby defined for subsequent operations.

Execution then branches to the end (S340).

If U_OFF was equal to zero in S302, i.e. if the voltage in link circuit 73, 74 is normal, a normal commutation then occurs based on the commutation table of FIG. 2.

In S304, counter CNT_P, which is used for pump monitoring as shown in FIG. 13, is set to CNT_P_MAX since commutation will subsequently occur.

In S306, the setpoints EN1_S, EN2_S, EN3_S for signals EN1 through EN3 are loaded in accordance with the combination HL_COMB of Hall signals HS1, HS2, HS3 from the table in FIG. 2. The tabulated values from FIG. 2 are labeled TEN1, TEN2, and TEN3. For example, if rotor 110 is in the angular position 0°–60° el., the combination HL_COMB of the Hall signals is HS1=1, HS2=0, HS3=1, and the following values are loaded: EN1_S=0, EN2_S=0, EN3_S=1.

Similarly, in S308 the setpoints IN1_S, IN2_S, IN3_S for signals IN1 through IN3 are loaded in accordance with the combination HL_COMB of Hall 4 signals HS1, HS2, HS3 from the table in FIG. 2. The table for the IN values is labeled TIN1, TIN2, TIN3. For the example from S306, IN1_S=1, IN2 S=TRISTATE, and IN3_S=1 for the angular position 0°–60° el.

Before commutation, two of the driver modules were activated and one driver module was deactivated. For example, before commutation in FIG. 8, modules 52 and 54 were activated and module 50 was deactivated. After commutation, for example, module 54 is deactivated and modules 50 and 52 are activated.

Steps S310 through S320 serve to switch off the driver module that was activated before commutation and is to be deactivated after commutation, i.e. module 54 in the above example. The module that is activated before and after commutation remains continuously activated in order to prevent power losses in motor 32.

In columns EN1, EN2, and EN3, the fields in which the respective driver module is activated during two successive angular regions each contain a box 740.

S310 therefore checks whether the setpoint EN1_S is 1 for signal EN1, i.e. whether EN1 is to be switched off after commutation. If so, EN1 is set to 1 in S312, and the driver module of the bridge arm of winding terminal L1 is deactivated. If EN1 was deactivated before commutation, another deactivation action has no effect.

In S314 through S320, the same happens for the bridge arms of winding terminals L2 and L3.

In S322, signals IN1, IN2, and IN3 are set to the setpoints IN1_S, IN2_S, and IN3_S.

In S324, signals EN1, EN2, and EN3 are set to the setpoints EN1_S, EN2_S, and EN3_S. Since the driver modules that are to be deactivated after commutation have already been deactivated in S310 through S320, the effect of S324 is to switch on the driver module that was previously switched off. The other driver module, which is switched on both before and after commutation, was of course not switched off in S310 through S320, in order to prevent the power losses in motor 32 that would result from an interruption of current.

The COMMUT subprogram terminates at S340.

In order to allow motor 32 to rotate in both directions if necessary, a second commutation table for the other rotation direction must be defined by analogy with FIG. 2. In many cases, however, for example with radial fans, operation is required in only one rotation direction. Operation with a commutation table for the opposite direction is readily possible for one skilled in the art and will therefore not be described further.

FIG. 30 shows an overview of a further exemplary embodiment of an electronically commutated motor 32 according to the present invention which is similar to FIG. 8. Identical or functionally identical parts are given identical reference characters and usually are not mentioned again.

In FIG. 30, the hardware current limitation by means of current limiters 131 and 161 is omitted. This is performed entirely by the program executing in μC 23, as indicated symbolically by diagram 199. What is used here, for example, is a control function analogous to FIG. 16, in which the calculation of SW_MIN and SW_MAX is performed as in FIGS. 27 and 28, straight lines 298 and 299 being located on straight lines $U_{min}$ 296 and $U_{max}$ 294. The offset OFFSET1 of FIG. 28 is 0 in this context, since PWM generator 182 is omitted.

Because hardware current limitation 131, 161 is no longer being used, the PWM signal PWM 181 necessary for alternate switching on and off is fed directly from output 157 of μC 23 into control circuits 50, 52, and 54, and also brings about the necessary current limitation, so that motor 32 can be operated only in safe range 295. Measurement of the motor current is eliminated here. It is very advantageous that the value of the current can be limited as a function of the rotation speed, for example in order to obtain a smooth startup.

Figure 31:
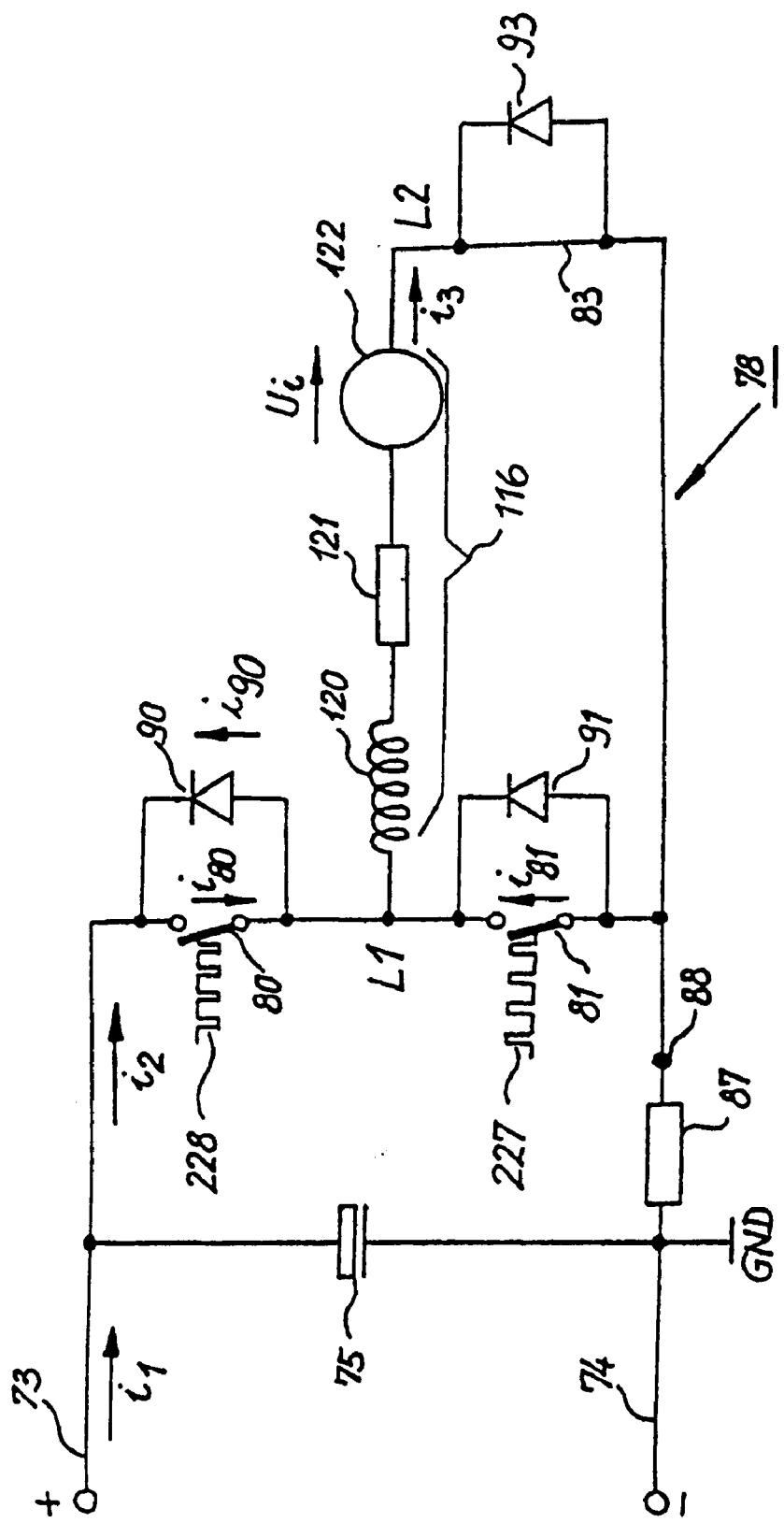
FIG. 31 shows an electrical equivalent circuit diagram like that in FIG. 3, which shows only portions of full bridge circuit 78 of FIG. 1 and concerns a different manner of controlling the bridge.

FIG. 31 shows a further equivalent electrical circuit diagram like the one in FIG. 3, showing only portions of full bridge circuit 78 of FIG. 1. Identical or functionally identical parts are given identical reference characters, and usually are not mentioned again.

In FIG. 31, lower power switch 83 is closed instead of upper power switch 82 which was closed in FIG. 3. In addition, control signal 228 that is being switched on and off is now applied to upper power switch 80, and control signal 227 that is being switched on and off is applied to lower power switch 81.

The principal difference with this type of current flow through output stage 78 is the fact that in FIG. 31, the power switch that is permanently switched on for a specific angular region of rotor 110 is lower power switch 83, while in FIG. 3 it was upper power switch 82. The control of the power switches 80 and 81 which are being switched on and off is also correspondingly transposed, and an adapted table (FIG. 2) for the control logic must be used.

There is no change in this context regarding the generation of signals 227, 228, so that all the features of the motor according to the present invention that have been mentioned previously can be used in the same fashion for this exemplary embodiment.

Figure 32:
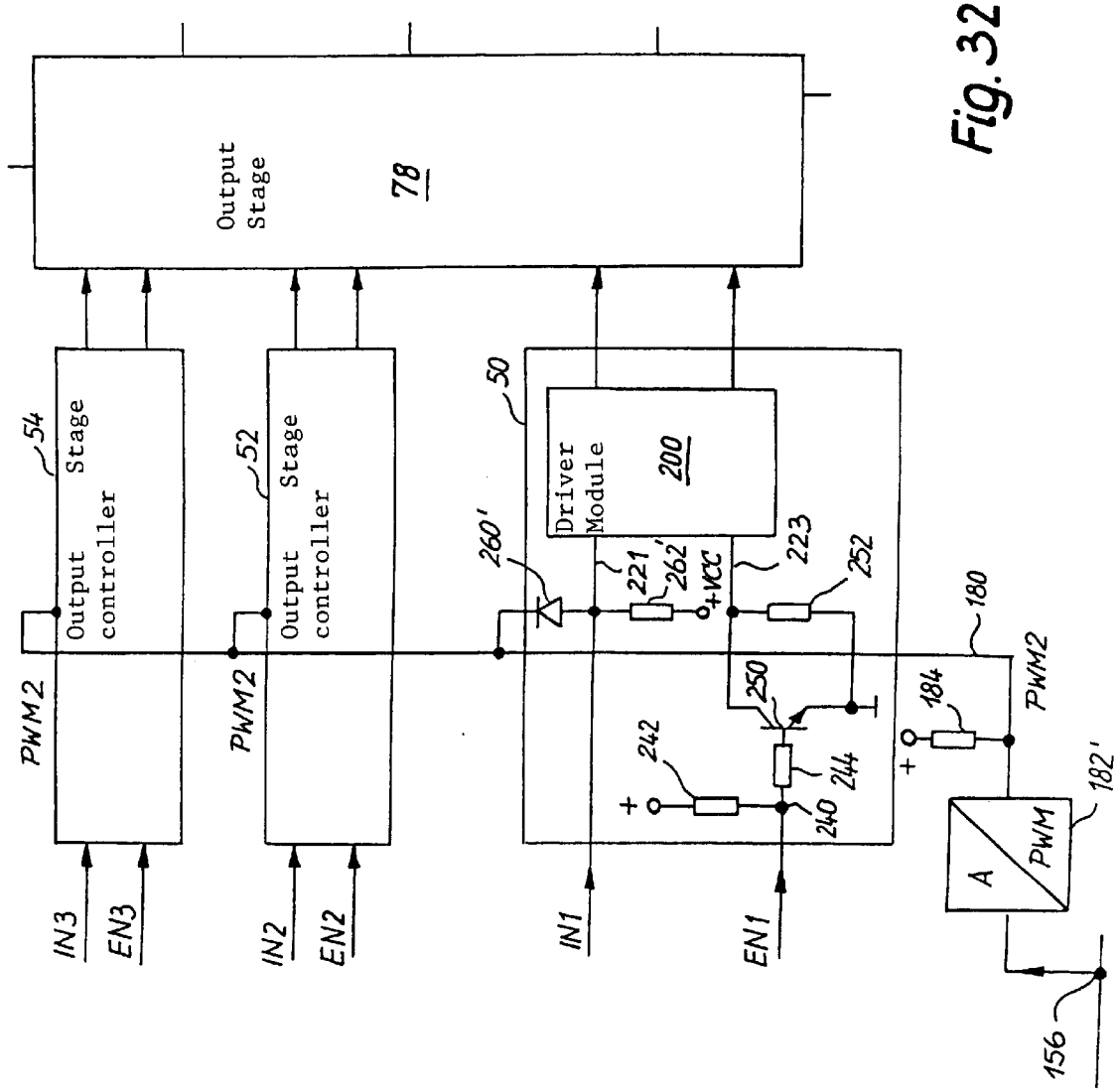
FIG. 32 shows a variant of FIG. 8 that is needed to control the variant shown in FIG. 31.

A necessary change in signals IN1, IN2, IN3 is described in FIG. 32.

One advantage of this circuit is that because lower power switch 83 is used, the bridge arm of L2 is also pumped. Operation is otherwise the same, except that the current $i_3$ flows in the opposite direction as compared to FIG. 3.

FIG. 32 shows a variant of FIG. 8. The circuit shown in FIG. 32 serves to control the variant shown in FIG. 31. A modified portion of FIG. 8 is depicted. All other parts correspond to those of FIG. 8 and are not depicted.

Zener diode 186 of FIG. 8 has been removed; diode 260 of FIG. 8 has been oppositely polarized and now has the reference character 260'; and resistor 262' is connected to +Vcc, whereas resistor 262 of FIG. 8 is connected to ground.

FIG. 32 makes it possible to switch on the lower power switches by setting IN1, IN2, or IN3 to zero. In the circuit of FIG. 8, setting one of the signals IN1, IN2, or IN3 caused signal PWM2 180 to be pulled through the respective diode (260) to ground.

Diode 260' is therefore used in FIG. 32 so that line IN1 is pulled by it to ground.

μC 23 can thereby switch on the lower power switches by setting IN1 (IN2, IN3) respectively to zero; and by setting IN1 (IN2, IN3) to TRISTATE, it can transfer the PWM signal PWM2 180, which for that purpose is inverted in PWM generator 182'.

Many modifications and variations are of course possible in the context of the invention.

In an electronically commutated motor, both the drive current ($i_2$) and the braking current ($i_2'$) are monitored. If the drive current is too high, a pulse duty factor that influences the current in the motor is reduced; and if the braking current is too high, that pulse duty factor is increased. An analog circuit having two current limiting members (131, 161) is described for this purpose; also a circuit in which these functions are implemented by means of the software of a microcontroller so that current measurement can be omitted; or lastly a combination of the two features, such that hardware current limitation and software current limitation coact.

What is claimed is:

1. An electronically commutated motor comprising
a permanent-magnet rotor (110) and a stator (114);
a stator winding arrangement (115, 116, 117) which can be supplied via a full bridge circuit (78) with current from a direct-current source having a positive line (73) and a negative line (74), which full bridge circuit (78) has, in each bridge arm, an upper MOSFET transistor that is connected to the positive line (73) of the direct-current source and a lower transistor that is connected to the negative line (74) of the direct-current source;
a commutation arrangement for commutating said transistors,
which commutation arrangement is configured in order, as a function at least of the position of the rotor (110), in a first bridge arm to switch on only one transistor and in a second bridge arm, controlled by a Pulse Width Modulation (PWM) signal, alternatingly to switch on the upper and the lower transistor; and
an arrangement which, as a function of at least one motor variable, upon the occurrence of a braking current ($i_2'$) in the bridge circuit that exceeds a predefined value, modifies the pulse duty factor (PWM2) of said PWM signal in such a way that the current produced by the motor (32) in generator mode is reduced.

2. The motor according to claim 1, further comprising
an arrangement for monitoring the voltage ($U_B$) at the direct-current source, which arrangement blocks all the transistors of the full bridge circuit (78) if a predefined upper limit value (U_MAX_OFF) of said voltage ($U_B$) is exceeded.

3. The motor according to claim 2, further comprising
a microprocessor (23), serving for motor control and
an A/D converter for converting the voltage ($U_B$) at the direct-current source into a digital value (U_AD) for further digital processing in the microprocessor (23).

4. The motor according to claim 1, further comprising
a microprocessor, serving for motor control and, in operation, supplying output signals for controlling the full bridge circuit (78), there being associated with each bridge arm a commutation module (50, 52, 54) for alternatingly switching on the upper and the lower transistor of said bridge arm, which commutation module has at least two signal inputs (e.g. IN1, EN1) that can be controlled by means of separate signal outputs of the microprocessor (23),
wherein the PWM signal (PWM2) is applied to one of said signal inputs (IN1, IN2, IN3),
and a signal output (IN1, IN2, IN3) of the microprocessor (23) associated with said signal input is switchable to a high-resistance state in order to activate, from the microprocessor, the alternating switching-on of the transistors of said bridge arm by means of the PWM signal (PWM2).

5. The motor according to claim 1, further comprising
a microprocessor (23), serving for motor control, and also serving to control the rotation speed of the motor and supplying, at at least one output, a processor PWM signal (PWM1) for influencing the rotation speed of the motor;
and having an arrangement for limiting the pulse duty factor (PWM1) of said processor PWM signal to a rotation speed-dependent value.

6. The motor according to claim 5, wherein said pulse duty factor (PWM1) is limited, during braking operation, to a minimum value that decreases as the rotation speed (n) of the motor (32) decreases.

7. The motor according to claim 5, wherein
the processor PWM signal influences, by means of its pulse duty factor (PWM1), the charge state of a first capacitor (159); and a second capacitor (148) is provided which is connected via a resistor arrangement (150, 152) to said first capacitor (159),
and the pulse duty factor (PWM2) of the PWM signal conveyed to the full bridge circuit (78) is controlled substantially by the voltage at one of said two capacitors (148, 159).

8. The motor according to claim 7, wherein the second capacitor (148) has a lower capacitance than the first capacitor (159).

9. The motor according to claim 7, wherein
a current limiting arrangement (131, 161) for the motor is provided which, when the drive current ($i_2$) exceeds a predefined limit value, modifies the charge of said second capacitor (148) in a predefined direction,
and which, when the braking current ($i_2'$) exceeds a predefined limit value, modifies the charge of said second capacitor (148) in a direction opposite to the predefined direction.

10. An electronically commutated motor comprising
a rotor (110) and a stator (114);
a stator winding arrangement (115, 116, 117) which is supplied via a full bridge circuit (78) with current from a direct-current source having a positive line (73) and a negative line (74), which full bridge circuit (78) has, in each bridge arm, an upper NMOS transistor that is connected to the positive line (73) of the direct-current source and a lower transistor that is connected to the negative line (74) of the direct-current source,
and there is associated, with each upper transistor of a bridge arm, a storage capacitor (230), chargeable via the lower transistor of said bridge arm, and serving to supply said upper transistor with a control voltage;
a commutation arrangement for commutating said transistors, which commutation arrangement is configured in order, as a function at least of the position of the rotor (110), in a first bridge arm, to switch on only one transistor and in a second bridge arm alternatingly to switch on the upper and the lower transistor, and a motor speed monitoring arrangement for monitoring the motor rotation speed (n) and for briefly blocking the upper transistors and for briefly switching on the lower transistors of said full bridge circuit when motor speed falls below a predefined rotation speed value and a predefined time has elapsed, in order to charge the storage capacitors (230) of the upper transistors and thereby to ensure reliable control of said upper transistors, even at low motor rotation speeds or when the motor is at rest.

11. A method of operating an electronically commutated motor that comprises:

a permanent-magnet rotor (110) and a stator (114);

a stator winding arrangement (115, 116, 117) which can be supplied via a full bridge circuit (78) with current from a direct-current source having a positive line (73) and a negative line (74), which full bridge circuit (78) has, in each bridge arm, an upper MOSFET transistor that is connected to a positive line (73) of the direct-current source and a lower transistor that is connected to a negative line (74) of the direct-current source;

a commutation arrangement for commutating said transistors, which commutation arrangement is configured in order, as a function at least of the position of the rotor (110), in a first bridge arm to switch on only one transistor and in a second bridge arm, controlled by a PWM signal, alternatingly to switch on the upper and the lower transistor; and a microprocessor (23), said method comprising the following steps:

continuously monitoring, based on a synthetic model of the motor (32) and a value for the motor rotation speed (n) conveyed to the microprocessor, whether the direct-current voltage ($U_E$) conveyed to the motor is at a predefined relationship to the voltage ($U_i$) induced in the motor;

if the motor is being operated in generator mode and the direct-current voltage ($U_E$) applied to it lies beyond the predefined relationship, modifying the pulse duty factor of the PWM signal, with which the upper and the lower transistor of the second bridge arm are alternatingly switched on, in order, by means of that modifying step, to limit the braking current ($i_2'$).

12. A method of operating an electronically commutated motor comprising a permanent-magnet rotor (110) and a stator (114);

a stator winding arrangement (115, 116, 117) which is supplied via a full bridge circuit (78) with current from a direct-current source having a positive line (73) and a negative line (74), said full bridge circuit (78) having a plurality of bridge arms and having, in each bridge arm, an upper MOSFET transistor that is connected to the positive line (73) of the direct-current source and a lower transistor that is connected to the negative line (74) of the direct-current source;

a commutation arrangement for commutating said transistors, which commutation arrangement is configured in order, as a function at least of the position of the rotor (110), in a first bridge arm to switch on only one transistor and in a second bridge arm, controlled by a Pulse Width Modulation (PWM) signal, alternatingly to switch on the upper and the lower transistor;

and a microprocessor (23), said method comprising the following steps:

monitoring, based on a synthetic model of the motor (32), whether the direct-current voltage ($U_E$) conveyed to the motor is at a predefined relationship to the voltage ($U_i$) induced in the motor;

if the relationship is not being adhered to, correspondingly modifying, the pulse duty factor of the PWM signal, with which the upper and the lower transistor of the second bridge arm are alternatingly switched on, in order, by means of said change in the pulse duty factor, to counteract any excursion beyond the predefined relationship.

13. An electronically commutated motor comprising a rotor (110), and a stator (114) on which is arranged a stator winding arrangement (115, 116, 117) with which is associated a full bridge circuit (78) having a plurality of parallel bridge arms, each of which has an upper transistor (80) that is connected to a positive line (73) of a direct-current source and a lower transistor (81) that is connected to a negative line (74) of the direct-current source, the two transistors (80, 81) of a bridge arm each having associated therewith a control circuit (50, 52, 54) which as a function of a first input signal (EN1) can be activated and deactivated and, in the deactivated state, blocks both transistors (80, 81) of the associated bridge arm, and which, as a function of a second input signal (IN1), in the state activated by the first input signal (EN1), can be switched over in such a way that either the upper transistor (80) or the lower transistor (81) is made conductive;

furthermore having a microprocessor (23), for generating the first input signal at a first output (EN1) and for generating the second input signal at a second output (IN1) thereof; and a Pulse Width Modulation (PWM) signal source for generating a third input signal (80) in the form of a PWM signal with a controllable pulse duty factor (PWM; PWM2), which third input signal is applied to the control circuit (50) in parallel with the second input signal (IN1) and is effective only if the second output (IN1) of the microprocessor (23) is switched over into a predefined switching state.

14. The motor according to claim 13, wherein the predefined switching state of the second output (IN1) of the microprocessor (23) is a high-resistance state (TRISTATE).

15. The motor according to claim 13, wherein the third input signal (180) is applied to the control circuit (50, 52, 54) through a diode (260).

16. The motor according to claim 13, wherein the amplitude of the third input signal (180) is limited.

17. The motor according to claim 15, wherein the control circuit has an input (223) to which is connected a resistor (252) whose magnitude influences the magnitude of a dead time (Δt) upon switching over between the transistors (80, 81) of the associated bridge arm;

and a controllable switching member (25), controllable by means of the first input signal (EN1), for at least partially bypassing said resistor (252).

18. The motor according to claim 17, wherein the controllable switching member (250) is controllable into a predefined switching state when the first output (EN1) of the microprocessor (23) assumes a high-resistance state, in order thereby to block the associated bridge arm (80, 81).

19. The motor according to claim 13, wherein the pulse duty factor (PWM2) of the PWM signal source (182) is controllable by means of the voltage at a capacitor (148), and further comprising a first current limiting arrangement (131) for modifying, in a predefined direction, said voltage, when too high a drive current flows in the stator winding arrangement, so that said drive current is lowered by means of a corresponding modification of the pulse duty factor (PWM2), and a second current limiting arrangement (161) for modifying, in a direction opposite to said predefined direction, said voltage, when too high a braking current flows in the stator winding arrangement, in order to lower the braking current by means of a corresponding modification of the pulse duty factor (PWM2).

20. The motor according to claim 19, wherein a limiting apparatus for the pulse duty factor (PWM2) is provided in order to prevent, in the presence of an extreme value of the pulse duty factor (PWM2), the lower transistor (81) of a bridge arm from being continuously open, and to prevent the upper transistor (80) from being continuously closed.

21. The motor according to claim 13, wherein the motor is configured with at least three phases and comprises at least three respective control circuits (50, 52, 54) for the bridge arms (21, 22, 23), and an arrangement which, in the context of a commutation, prevents any interruption of the first input signal (EN1) to a control circuit when said control circuit must be activated before and after the commutation.

* * * * *